(12) United States Patent
Wulff

(10) Patent No.: US 8,191,914 B2
(45) Date of Patent: Jun. 5, 2012

(54) ROLL COUPLING TRAILER HITCH ASSEMBLY

(76) Inventor: Lawrence H. Wulff, Vernon (CA)

( * ) Notice: Subject to any disclaimer, the term of this patent is extended or adjusted under 35 U.S.C. 154(b) by 0 days.

(21) Appl. No.: 12/737,454

(22) PCT Filed: Jul. 6, 2009

(86) PCT No.: PCT/CA2009/000936
§ 371 (c)(1),
(2), (4) Date: Jan. 14, 2011

(87) PCT Pub. No.: WO2010/006417
PCT Pub. Date: Jan. 21, 2010

(65) Prior Publication Data
US 2011/0115196 A1    May 19, 2011

Related U.S. Application Data

(63) Continuation-in-part of application No. 12/216,981, filed on Jul. 14, 2008.

(60) Provisional application No. 61/159,926, filed on Mar. 13, 2009, provisional application No. 61/105,864, filed on Oct. 16, 2008, provisional application No. 61/104,365, filed on Oct. 10, 2008, provisional application No. 61/080,737, filed on Jul. 15, 2008.

(51) Int. Cl.
*B60D 1/14* (2006.01)
(52) U.S. Cl. ............... 280/456.1; 280/477; 280/504; 280/515
(58) Field of Classification Search .............. 280/456.1, 280/515, 504, 477
See application file for complete search history.

(56) References Cited

U.S. PATENT DOCUMENTS

| 774,903 | A |  | 11/1904 | Ammann |
|---|---|---|---|---|
| 776,292 | A |  | 11/1904 | Buller |
| 788,692 | A |  | 5/1905 | Ammann |
| 1,233,849 | A |  | 7/1917 | Culhane |
| 1,524,503 | A |  | 1/1925 | Bennett et al. |
| 1,552,620 | A |  | 9/1925 | Knox |
| 1,643,885 | A |  | 9/1927 | Gill |
| 1,957,917 | A |  | 5/1934 | Storey |
| 2,251,656 | A |  | 8/1941 | Botelho |
| 2,360,902 | A |  | 10/1944 | Simmons |
| 2,460,466 | A |  | 2/1949 | Nogle |
| 2,491,373 | A | * | 12/1949 | Goff ............................ 280/508 |

(Continued)

FOREIGN PATENT DOCUMENTS

CA    2481361    4/2006
(Continued)

*Primary Examiner* — Anne Marie Boehler
*Assistant Examiner* — Michael Stabley
(74) *Attorney, Agent, or Firm* — Antony C. Edwards

(57) ABSTRACT

A roll coupling assembly includes a roll torque transfer structure and an alignment mechanism. The torque transfer structure includes a first load bearing structure mountable to the rear of the tow vehicle, and a second load bearing structure mountable to the front of the trailer drawbar. Corresponding first and second load bearing surfaces cooperate so as to releasably mate with one another for towing of the trailer behind the tow vehicle. The bearing surfaces are distributed across a substantially planar interface between the rear of the tow vehicle and the front of the trailer drawbar so as to distribute to the tow vehicle torque imparted to the drawbar by relative rolling motion between the trailer and tow vehicle. The coupling alignment mechanism adjusts the relative orientation of the first and second load bearing surfaces so as to align them for mating to one another.

22 Claims, 35 Drawing Sheets

U.S. PATENT DOCUMENTS

| | | |
|---|---|---|
| 2,591,916 A | 4/1952 | Caughman |
| 2,673,096 A * | 3/1954 | Bendtsen .................. 280/504 |
| 3,052,487 A | 3/1954 | Harbers |
| 2,871,030 A | 1/1959 | Hollis |
| 3,298,706 A | 1/1967 | Lyall |
| 3,519,287 A | 7/1970 | Pontbriand |
| 4,792,151 A | 12/1988 | Feld |
| 4,962,945 A | 10/1990 | Vannoy |
| 5,183,284 A | 2/1993 | Paplinski |
| 5,244,047 A | 9/1993 | Eudy |
| 5,967,541 A | 10/1999 | Johansen |
| 6,047,982 A | 4/2000 | McClure |
| 6,139,043 A | 10/2000 | Gries et al. |
| 6,764,092 B1 | 7/2004 | Greaves, Jr. |
| 6,908,093 B1 | 6/2005 | Putnam |

FOREIGN PATENT DOCUMENTS

| | | |
|---|---|---|
| WO | WO 2005/002889 | 1/2005 |

* cited by examiner

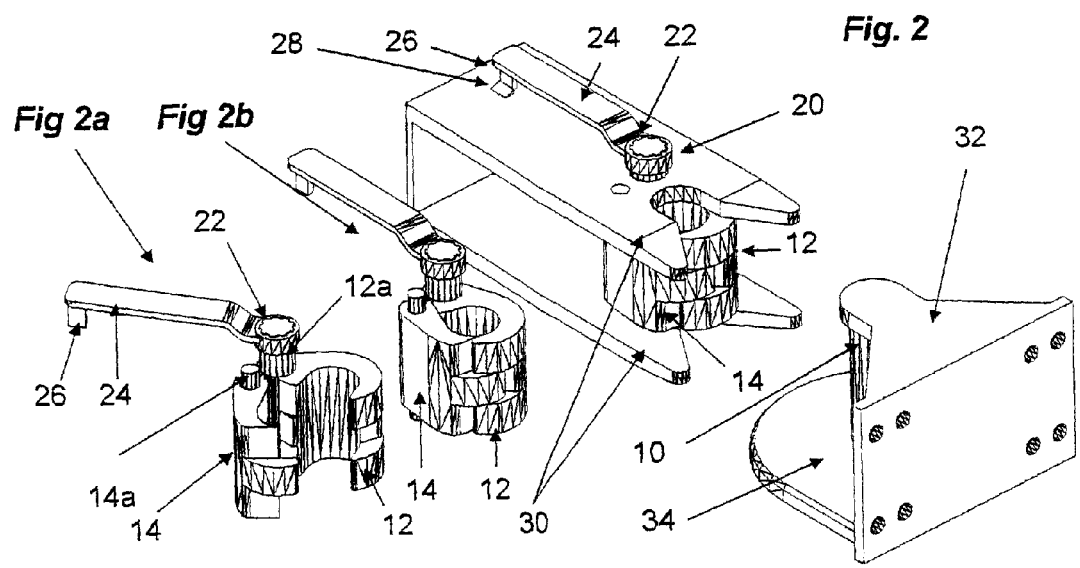
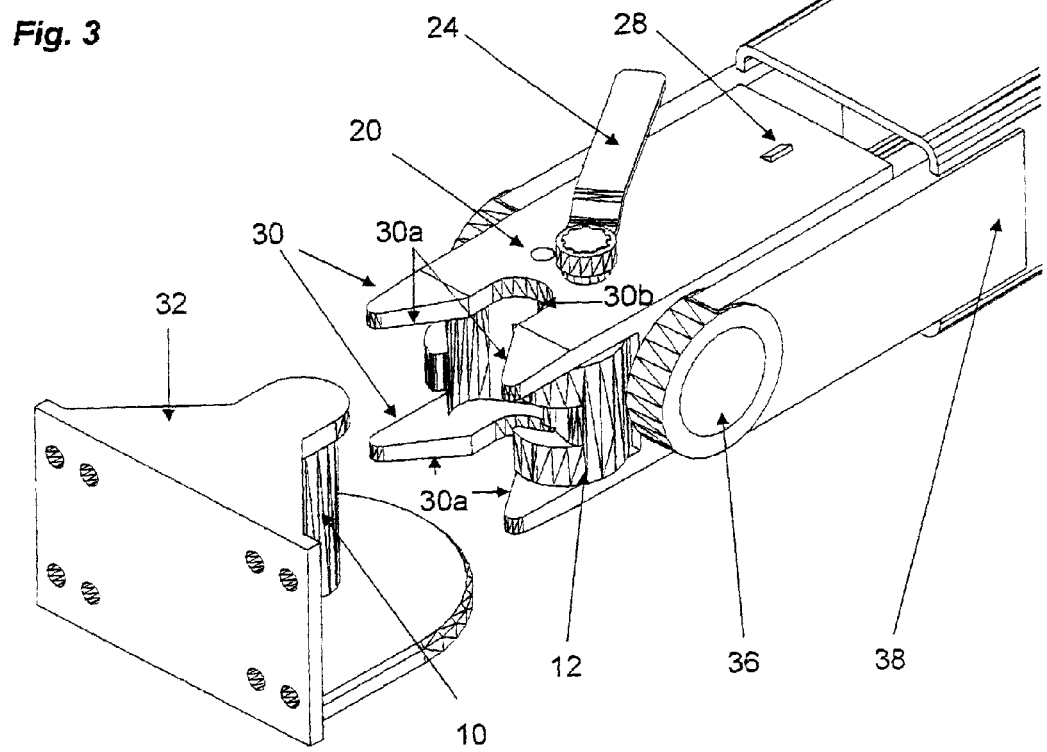

32   36   38

C

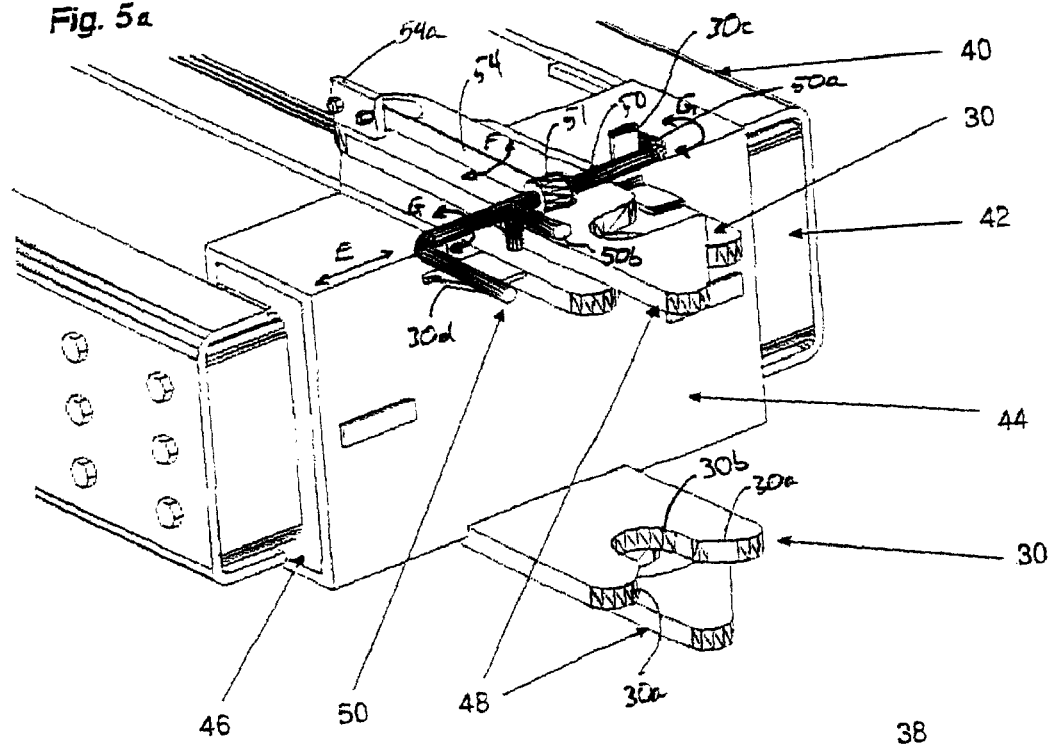
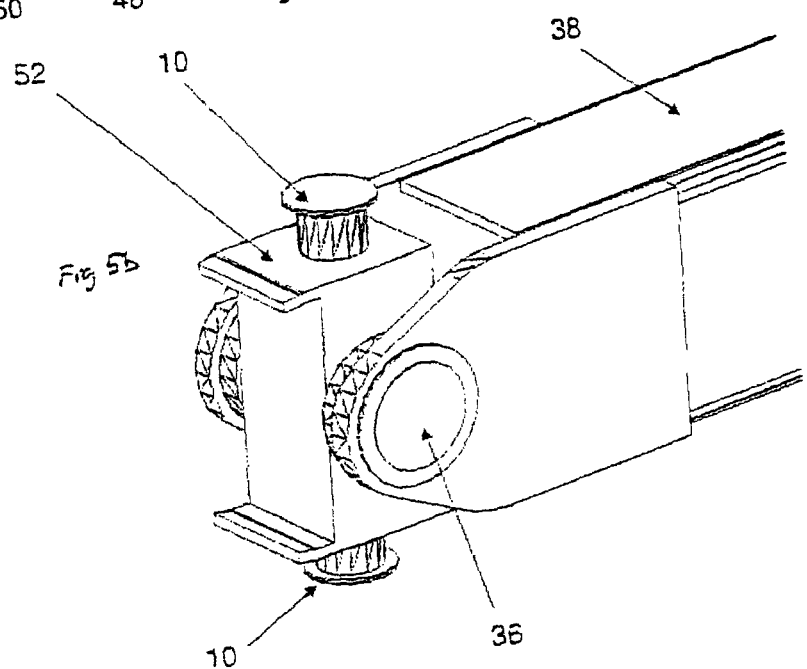

236  228 232 230

240 238 222  224a 234  244 232  230 228  218 242

Fig. 34
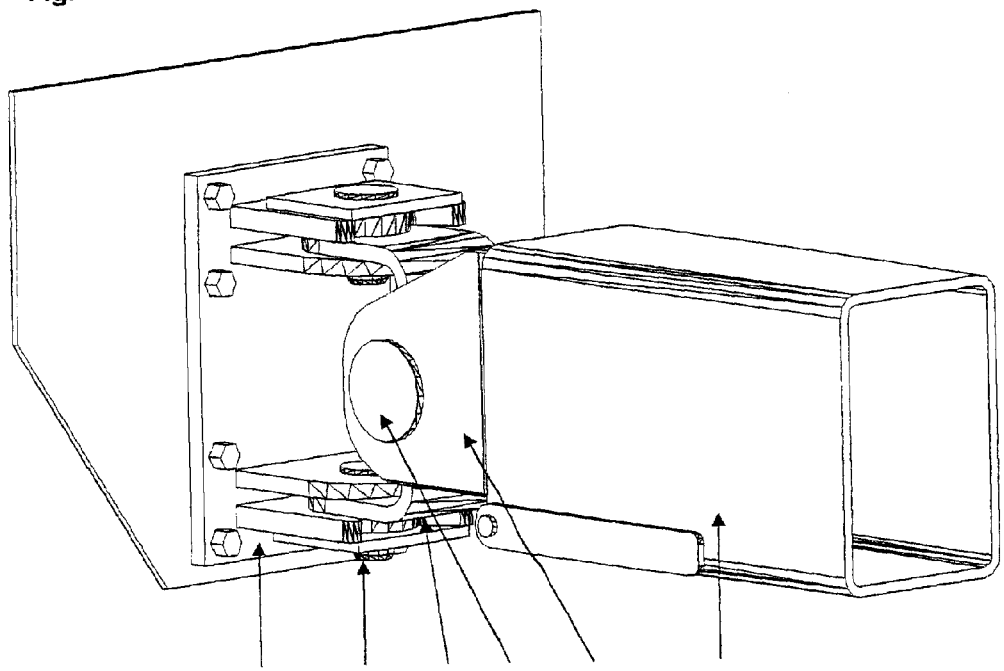
Fig. 35   310   316  318  320   322    324    336
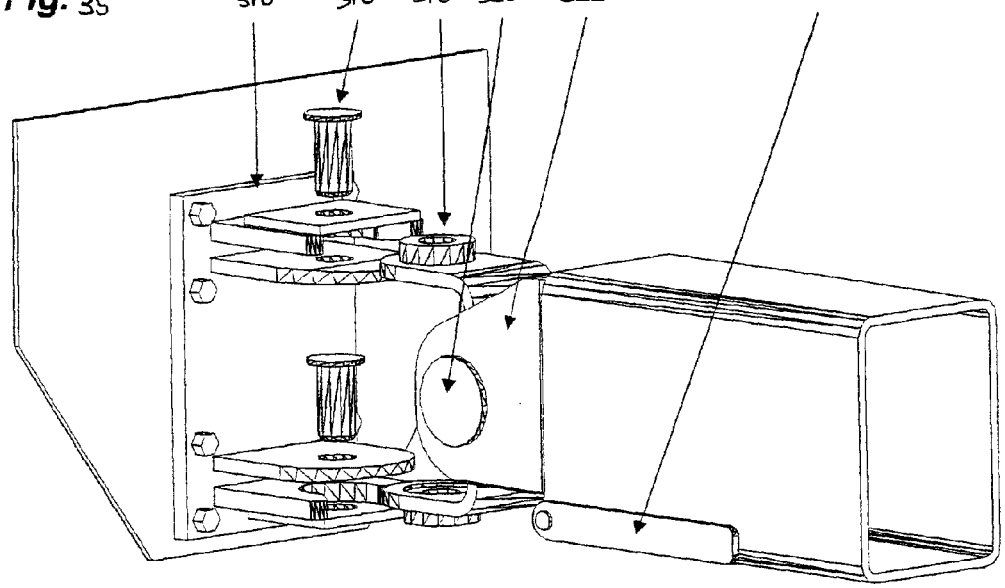

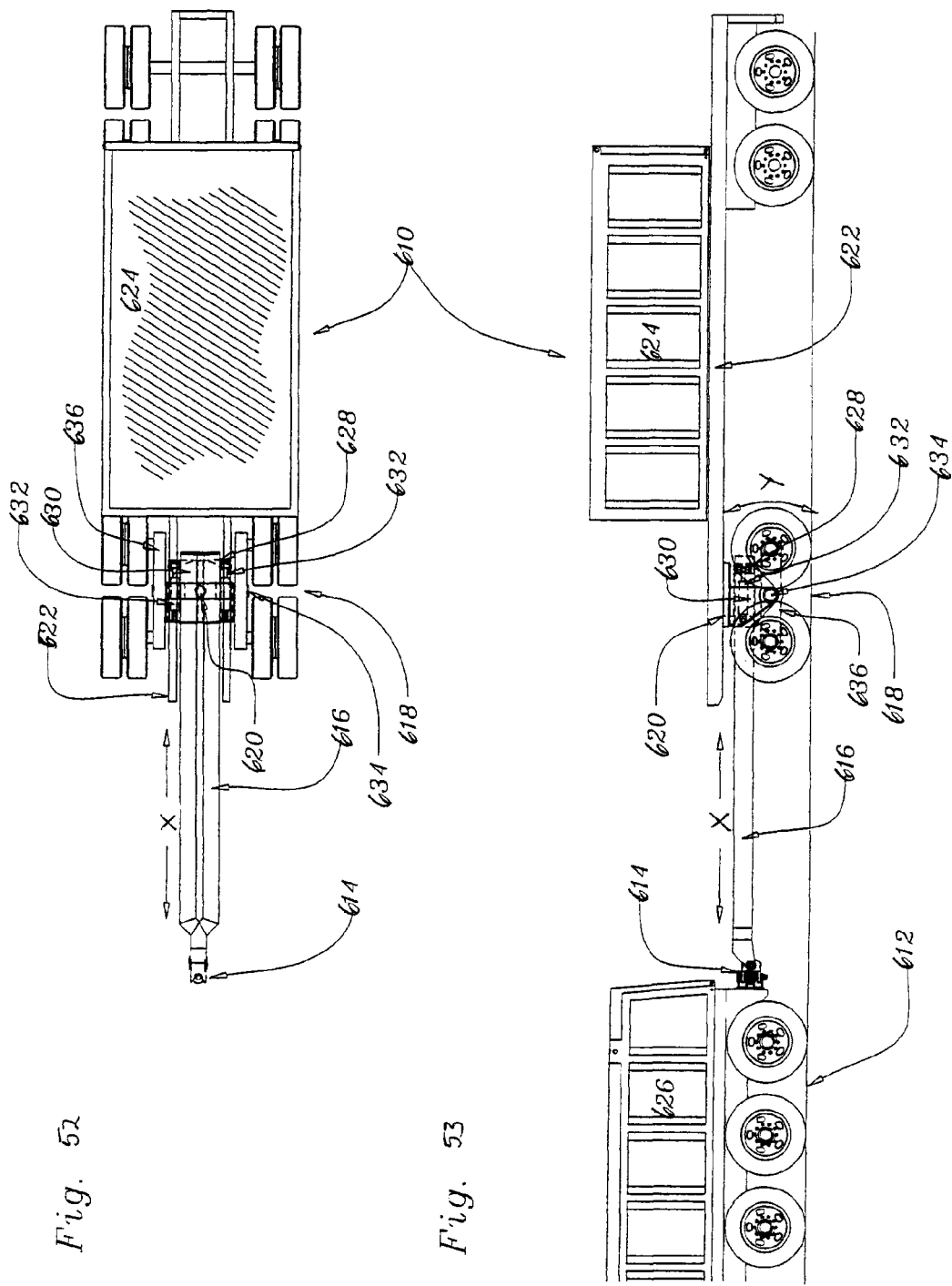

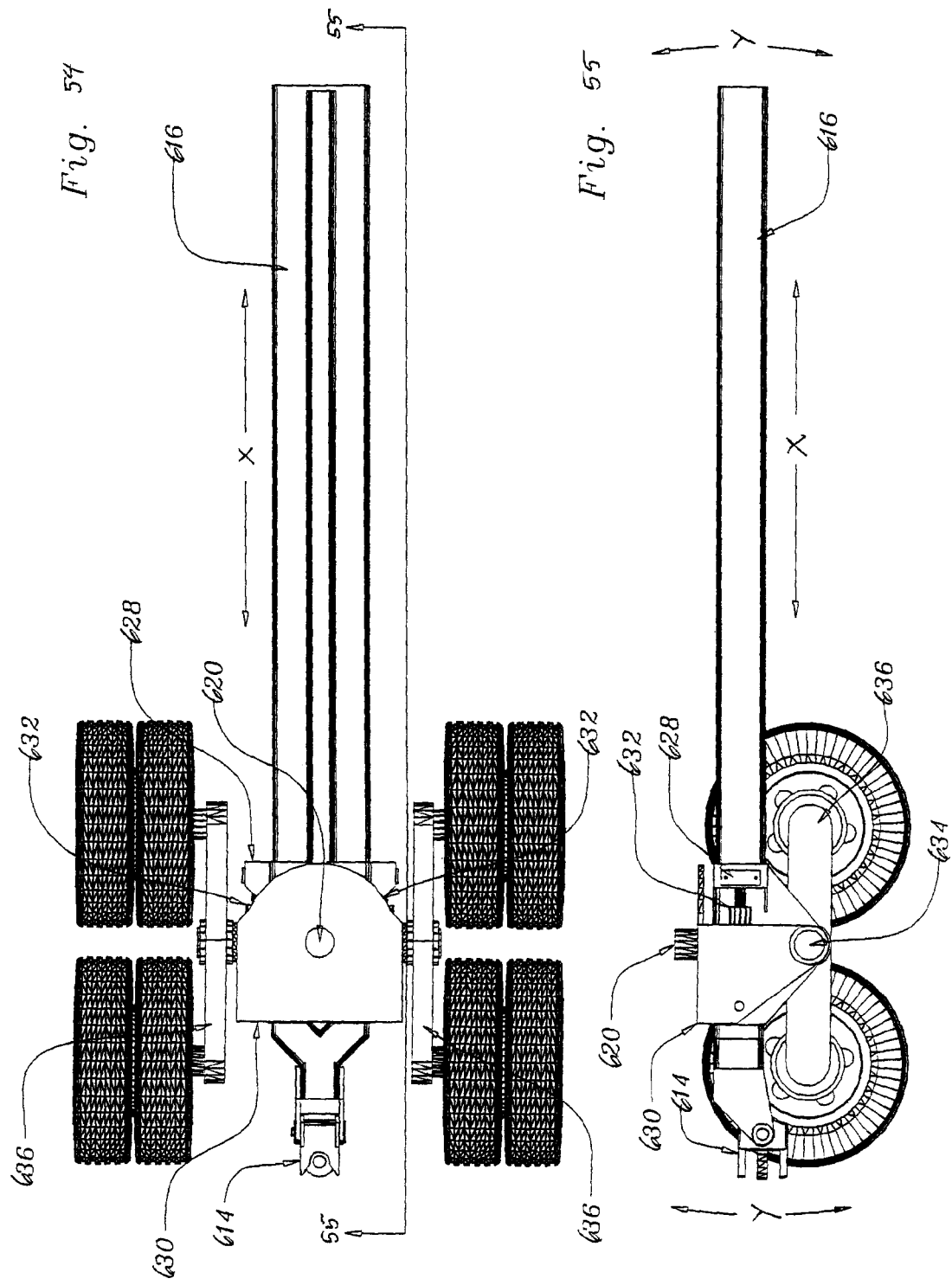

ROLL COUPLING TRAILER HITCH ASSEMBLY

CROSS REFERENCE TO RELATED APPLICATION

This application claims priority from United States Provisional Patent Application Numbers:

61/080,737 filed Jul. 15, 2008, entitled, Roll-Coupled Transfer Trailer;

61/104,365 filed Oct. 10, 2008, entitled, Roll Coupling Hitch Assembly;

61/105,864 filed Oct. 16, 2008, entitled, Self Aligning Roll Coupling Hitch Assembly; and 61/159,926 filed Mar. 13, 2009, entitled, Self-Aligning Roll-Coupling Hitch Assembly.

For the United States only, this application is a Continuation-in-Part of the U.S. application Ser. No. 12/216,981, filed Jul. 14, 2008, entitled Roll Coupling Trailer Hitch Assembly.

FIELD OF THE INVENTION

The present invention relates to improvements in devices for connecting a trailer to the rear of a tow vehicle so as to roll couple the trailer to the tow vehicle to improve vehicle stability.

BACKGROUND OF THE INVENTION

In the prior art applicant is aware of U.S. Pat. No. 1,524,503, which issued Jan. 27, 1925 to Bennett et al for Trailer Coupling, U.S. Pat. No. 1,552,620, which issued Sep. 8, 1925 to Knox for Trailer Coupling, U.S. Pat. No. 2,460,466, which issued Feb. 1, 1949 to Nogle for Trailer Dolly, U.S. Pat. No. 2,360,902, which issued Oct. 24, 1944 to Simmons for Vehicle, U.S. Pat. No. 1,957,917, which issued May 8, 1934 to Storey for Tractor, U.S. Pat. No. 3,298,706, which issued Jan. 17, 1967 to Lyall for Heavy Motor Vehicles and Equipment, U.S. Pat. No. 1,643,885, which issued Sep. 27, 1927 to Gill for Means for Loading and Hauling Automobiles.

Knox and Bennett describe trailer coupling assemblies using two vertically aligned hitch points for the purpose of automatically elevating a trailer while connecting the trailer to the tow vehicle in order to transfer trailer weight to the rear axle of the tow vehicle.

Nogle discloses a wheeled dolly having two horizontally aligned connecting points to carry the weight of the front of a trailer towed behind the dolly.

Simmons describes providing one or more connection points for the purposes of selectively transferring weight from one portion of the vehicle to another and to change the angular alignment of the interconnected vehicles.

Storey discloses providing articulation to interconnect two parts of a vehicle. Applicant is aware that in the prior art it is known to provide booster axles designed to be attached to the front or rear of vehicles for the purpose of transferring weight from the vehicles to the booster axles to increase the carrying capacity of the vehicles.

By way of example, Lyall describes an articulating booster axle designed to transfer part of a crane's weight to a booster axle that trails or tracks behind the crane.

Gill teaches an automobile carrier with a hitch assembly located aft of the truck frame.

Applicant has in the present invention improved on his invention described and claimed in his United States patent application entitled Roll coupling Trailer Hitch Assembly, filed Jul. 14, 2008, and published Jan. 15, 2009, under publication number US2009-0014982.

As commercial vehicles increase load capacity by increasing the number of weight bearing axles over a given length, the vehicle's centre of gravity is raised and the vehicle becomes increasingly unstable while in motion. In applicant's experience, the governing governmental authorities have started to restrict weights on combination vehicles where the trailers are attached to the rear of tow vehicles (including dump truck and pony trailer combinations, or other truck and trailer combinations, or combinations where a trailer is towed by another trailer) in order to reduce the number of accidents involving these vehicles.

In applicant's experience, at least with respect to truck and trailer combinations, roll coupling these types of vehicle combinations may improve safety and provide an alternative to reducing weight limits by the governing authorities. To the knowledge of applicant, tridem (that is, three axle) pony trailers are presently limited to 21,000 kgs on the trailer axles in British Columbia, Canada. The previous maximum weight for a tridem axle group in British Columbia was 24,000 kgs.

Roll coupling may provide improved yaw and roll stability where there is roll coupling between the tow vehicle and towed trailer when used in conjunction with sufficiently torsionally strong draw bars and corresponding supporting framework on the trailer to resist twisting during initial rolling motion of the trailer and so as to import the resulting torque to the roll coupling and thence to the tow vehicle. A single roll coupling hitch or a plurality of diagonal, horizontal or vertically aligned hitch assemblies and contact points may be used as required for different applications to provide roll coupling and so as to allow legal hitch offset distances, and so as to provide redundant critical hitch components and so as to reduce operating stresses on individual hitch components. Using common hitch components whenever possible also enables the tow vehicle to be used with trailers equipped with lunette rings, that is, which are not equipped with roll couplers.

A dynamic analysis was conducted to simulate the performance of roll coupling utilizing the University of Michigan Transportation Institute (UMTRI) yaw/roll model for a tandem truck/tridem pony trailer for the following four conditions: Loaded truck (GVW 26 100 kg), loaded trailer (GVW 21 000 kg)—no roll-coupling; Empty truck (GVW 13 695 kg), loaded trailer (GVW 21 000 kg)—no roll-coupling; Loaded truck (GVW 26 100 kg), loaded trailer (GVW 24 000 kg)—roll-coupling; and, Empty truck (GVW 13 695 kg), loaded trailer (GVW 24 000 kg)—roll-coupling.

The truck trailer dimensions are summarized in Table 1. Loads were placed on the truck and trailer so that the maximum axle group loads were achieved at maximum legal height (4.15 m).

TABLE 1

Summary of truck/trailer dimensions

| Parameter | Dimension (m) |
|---|---|
| Truck | |
| Wheelbase | 6.109 |
| Drive group spread | 1.397 |
| Hitch offset | 1.448 |
| Hitch height | 0.591 |
| Trailer | |
| Wheelbase | 6.464 |
| Trailer group spread | 2.769 |
| Deck height | 0.864 |

The following performance measures were evaluated for each load condition. The performance measures are described below. Handling performance—oversteer transition (H-P1); Handling performance—understeer coefficient at 0.3 g (H-P2); Handling performance—understeer coefficient at 0.15 g (H-P3); Handling performance—understeer coefficient at 0.25 g (H-RTAC); Static rollover threshold (SRT); Load transfer ratio (LTR); Rearward Amplification (RA); Lateral friction utilization (LFU); Friction demand (FD); Low-speed off-tracking (LSOT); High-speed off-tracking (HSOT); Transient off-tracking (TOT).

The simulation results are summarized in Table 2.

The handling performance of the loaded truck/pony trailer was improved with roll coupling. The degree of oversteer occurring at high lateral accelerations was reduced and the transition from understeer to oversteer occurred at a higher lateral acceleration when roll coupling was present. The handling performance was essentially the same for both the non roll coupled and roll coupled trailers in combination with an empty truck. However the roll coupled trailer exhibited less understeer and therefore has slightly improved handling characteristics.

TABLE 2

Simulation Results

| | | Tandem truck/Tridem pony trailer | | | |
|---|---|---|---|---|---|
| Performance Measures | Performance Standard | Non-roll coupled Loaded Truck | Non-roll coupled Empty Truck | Roll coupled Loaded Truck | Roll coupled Empty Truck |
| Handling performance (point #1) Oversteer transition | >0.20 g's | 0.209 | 0.373 | 0.217 | 0.318 |
| Handling performance (point #2) USC at 0.3 g | >−4.45 deg/g | −4.081 | 0.671 | −3.175 | 0.339 |
| Handling performance (point #3) USC at 0.15 g | >0.50, <2.00 deg/g | 0.961 | 2.627 | 1.515 | 2.049 |
| Handling performance (RTAC) USC at 0.25 g | >−4.45 deg/g | −2.171 | 2.530 | −1.159 | 1.439 |
| Static rollover threshold | >0.35 g's | 0.348 | 0.410 | 0.372 | 0.513 |
| Load transfer ratio | <0.60 | 0.725 | 0.709 | 0.524 | 0.510 |
| Rearward amplification | <2.00 | 1.992 | 2.011 | 1.728 | 1.841 |
| Low-speed lateral Friction utilization (low friction) | <0.80 | 0.457 | 0.362 | 0.532 | 0.396 |
| Friction demand | <0.10 | 0.185 | 0.441 | 0.191 | 0.424 |
| Low-speed offtracking | <5.60 m | 2.483 | 2.341 | 2.591 | 2.468 |
| High-speed offtracking | <0.46 m | 0.559 | 0.330 | 0.495 | 0.374 |
| Transient offtracking | <0.80 m | 0.571 | 0.518 | 0.492 | 0.423 |
| Load Height - truck (m) | | 4.15 | 2 | 4.15 | 2 |
| Load Height - trailer (m) | | 4.15 | 4.15 | 4.15 | 4.15 |
| Steering axle load (kg) | | 9 100 | 5 665 | 9 100 | 5 665 |
| Drive Group load (kg) | | 17 000 | 8 030 | 17 000 | 8 030 |
| Trailer load (kg) | | 21 000 | 21 000 | 24 000 | 24 000 |
| Gross Combination Weight (kg) | | 47 100 | 34 695 | 50 100 | 37 695 |

Stability was improved under both loading conditions with roll coupling, enabling the static rollover performance standard of 0.35 g to be achieved when coupled with a loaded truck.

Roll coupling resulted in an improvement dynamic performance for all dynamic performance measures (that is, LTR, RA, and TOT as defined below). The use of roll coupling allowed all the dynamic performance standards to be achieved under both loading conditions. Of particular note is the significant improvement in load transfer ratio in the order of 28% under both loading conditions.

The low-speed performance was largely unaffected by roll coupling. However this configuration exhibited high levels of friction demand (FD) with and without roll coupling, particularly when the truck was unloaded. This implies that only a loaded truck should be used to haul a loaded trailer under low traction conditions. Even with a loaded truck care should be taken when negotiating tight turns.

The high-speed offtracking performance standard (<0.46 m) was achieved for both coupling methods when hauled by an empty truck. The standard was not achieved for either coupling method when hauled by a loaded truck, but performance was marginally better with a roll coupled trailer.

Understeer Coefficients (USC) were used to evaluate handling performance at steady-state conditions by calculating the understeer coefficient at 0.15 g, 0.30 g, (TAC 0.25 g). This measure is expressed in degrees per g which represents the slope of the handling diagram. Positive and negative values indicate understeer and oversteer levels respectively. This performance measure is determined during a ramp steer manoeuvre (ramp steer rate of 2 deg/sec at steering wheel) at a forward velocity of 100 km/h. The pass/fail criterion is addressed by comparing the understeer coefficient with the critical understeer coefficient, which can be expressed as $-Lg/U2$, where U is the vehicle speed (U=27.77 m/s (100 km/h)), L is the tractor or truck wheelbase (in metres), and g is acceleration due to gravity (9.81 m/s$^2$). If the value of the understeer coefficient is greater than the critical value, the vehicle will meet the criterion (TAC performance standard). In addition the lateral acceleration where the transition from understeer to oversteer (that is, the point where the understeer coefficient is zero) is also computed.

Static Rollover Threshold (SRT) is the level of steady lateral acceleration beyond which the configuration rolls over. The measure is expressed as the lateral acceleration (in g's) at which all wheels on one side, except the steer axle, lift off the ground. Configuration performance is considered satisfactory if the static rollover threshold is greater than or equal to 0.35 g.

Load Transfer Ratio (LTR) is defined as the ratio of the absolute value of the difference between the sum of the right wheel loads and the sum of the left wheel loads, to the sum of all the wheel loads. The front steering axle is excluded from the calculations because of its relatively high roll compliance. Configuration performance is considered satisfactory if the LTR is less than or equal to 0.60 (TAC performance standard). This performance measure is evaluated during a rapid lane change manoeuvre conducted at 88 km/h, yielding a lateral acceleration amplitude of 0.15 g and a period of 2.5 seconds at the tractor's steering axle.

Rearward Amplification (RWA) is defined as the ratio of the peak lateral acceleration at the mass centre of the rearmost trailer to that developed at the mass centre of the tractor. Configuration performance is considered satisfactory if the RWA is less than or equal to 2.0, which is the current TAC performance standard. This performance measure was evaluated in the same manoeuvre as LTR.

Friction Demand (FD) performance measure describes the non-tractive tire friction levels required at the drive axles of a tractor. Excessive friction demand is a contributing factor to jack-knife and also results in excessive tire wear. Friction demand is the absolute value of the ratio of the resultant sheer force acting at the drive tires divided by the cosine of the tractor/trailer articulation angle to the vertical load on the drive tires. Configuration performance is considered satisfactory if FD is less than or equal to 0.1 (TAC performance standard). This performance measure is evaluated in a 90-degree turn at a vehicle speed of 8.25 km/h. During the manoeuvre, the centre of the front steer axle tracks an arc with a 12.8-m radius (approximately a 14-m outside-wheel-path radius).

Lateral Friction Utilization (LFU) is a measure proposed by NRC to characterize the highest level of the lateral friction utilization at the steering axle. LFU is defined as the ratio of the sum of lateral forces to the vertical load, and the peak tire/road coefficient of adhesion. The tires of a steering axle that achieves a lateral friction utilization level of 1 are said to be saturated. Configuration performance is considered satisfactory if LFU is less than or equal to 0.80 (NRC recommended performance standard). Initially this performance measure was evaluated on a high friction surface. This measure was modified by evaluating LFU on low friction surfaces, which are more critical for steering performance, by using low friction tire characteristics ($\mu=0.2$). This performance measure was evaluated using the same manoeuvre as FD.

Low Speed Offtracking (LSOT) was measured as the maximum lateral displacement of the centre-line of the last axle of the configuration from the path taken by the centre of the steer axle. Configuration performance is considered satisfactory if LSOT is less than or equal to 5.6 m (TAC performance standard). This performance measure was evaluated using the same manoeuvre as FD and LFU.

High Speed Steady State Offtracking (HSOT) was measured as the maximum lateral displacement of the centre-line of the last axle of the configuration from the path taken by the centre of the steer axle. Configuration performance is considered satisfactory if HSOT is less than or equal to 0.46 m (TAC performance standard). This value represents a minimal clearance of 0.15 m between the trailer tires and the outside of a 3.66-m wide conventional traffic lane. This performance measure was evaluated when the vehicle is operated in a 393-m curve radius, at a speed of 100 km/h, thereby attaining a steady lateral acceleration level of 0.2 g.

Transient Offtracking (TOT) was measured as the maximum lateral displacement of the centre-line of the last axle of the configuration from the path taken by the centre of the steer axle. Configuration performance is considered satisfactory if TOT is less than or equal to 0.8 m (TAC performance standard). This performance measure was evaluated in the same manoeuvre as LTR and RWA.

SUMMARY OF THE INVENTION

A roll coupling system for roll coupling the drawbar of a trailer to the rear of a tow vehicle may be characterized as including:

a) a roll torque transfer structure including at least one first load bearing surface on a first load bearing structure mountable to the rear of the tow vehicle and adapted to be mounted closely adjacent thereto, and at least one second load bearing surface on a second load bearing structure mountable to the front of the trailer drawbar, wherein the first and second load bearing surfaces cooperate so as to releasably mate with one another for towing of the trailer behind the tow vehicle and, when the trailer is so mated to the tow vehicle, are distributed across a substantially planar interface, which may be vertical, between the rear of the tow vehicle and the front of the trailer drawbar so as to distribute torque imparted to the drawbar by relative rolling motion between the trailer and tow vehicle to the rear of the tow vehicle by distribution of resulting moments which are transferred to the tow vehicle so that the cumulative combined roll resistance of the tow vehicle and trailer resist the rolling of the trailer about the drawbar, and b) a coupling alignment mechanism to adjust the relative orientation of the first and second load bearing surfaces in the substantially planar interface so as to align the first and second load bearing surfaces for the mating with one another.

The coupling alignment mechanism may include at least one self-aligning guide cooperating between the first and second load bearing structures so as to urge relative alignment about a roll axis of the drawbar of the first and second load bearing surfaces as the rear of the tow vehicle and the front of the drawbar are urged together so as to urge the first and second load bearing surfaces to the mate with one another, wherein the coupling alignment mechanism includes a selectively rotatable roll coupler, selectively rotatable about the roll axis of the trailer drawbar, mounted between the front of the drawbar and the rear of the tow vehicle, and wherein the selectively rotatable coupler includes a selectively releasable lock, wherein the lock locks said coupler in a fixed roll coupling position, fixed relative to rotation about said roll axis, upon a pre-set forward translation speed being attained by the tow vehicle and trailer.

The first and second load bearing surfaces may mate at, at least two spaced apart load transfer points on the substantially planar interface. The first and second load bearing structures may be mounted at each of the at least two spaced apart load transfer points. At least one self-aligning guide may be mounted at least one of the two spaced apart load transfer points.

In one embodiment the planar interface is inclined from the vertical so that an upper position of the planar interface is tipped towards the tow vehicle so as to provide a pre-load roll force acting on the trailer to cause the trailer to lean into a corner, wherein an upper load transfer point is positioned forward of a lower load transfer point of the spaced apart load transfer points.

Typically the first and second load bearing structures include male and female load bearing structures. Further, each self-aligning guide may include at least one substantially v-shaped guide for guiding the male load bearing structure into mating engagement in the female load bearing structure. Each v-shaped guide may include a spaced apart pair of substantially v-shaped guides, where the pair of substantially v-shaped guides may be substantially parallel and wherein each guide may include a pair of arms forming the v-shape, and where the arms may extend substantially orthogonally from the substantially planar interface.

In one embodiment, the male load bearing structure includes a hook and the female load bearing structure includes a collar having an aperture sized for snug mating with the hook so as to journal the hook in the aperture. The hook may include a pintle hook and the collar may include a lunette ring.

The spaced apart load transfer points may form a substantially linear array. The array may be vertical, horizontal or otherwise aligned in the substantially planar interface.

The lock for locking the roll coupler includes a male portion interlocking into a corresponding female portion. In one embodiment the male portion is urged into interlocking with the female portion by a default driver biasing the male portion into registry with the female portion so that the roll coupling defaults to the locking of the roll coupler to roll couple the tow vehicle and trailer together. The default driver alignment mechanism may include a resilient driver, for example a spring. The lock may further include a return biasing driver for selectively unlocking the roll rotatable coupler so as to dis-engage the roll coupling of the tow vehicle and trailer.

The roll coupling may include in one example which is not intended to be limiting, a pair of plates, a first plate of which is adapted to be mounted to the rearmost end of the tow vehicle, a second plate of which is adapted to be mounted to the front end of the drawbar of the trailer. The pair of plates are substantially flush against one another when the trailer is coupled to the tow vehicle. The pair of plates pivot relative to one another in flush rotation one over the other. Each plate in the pair of plates has an aperture. When the apertures in the plates are aligned, the trailer is aligned for roll coupling with the tow vehicle. The male portion is mounted in one of the apertures. The other of the apertures is the female portion. The male portion is an elongate member which is projected into snug mating with said female portion to effect said roll coupling. The default driver urges the male portion, such as a pin member or the latch member, into the female portion to lock the roll coupler.

In one embodiment the default driver is a linear driver biasing the member linearly into registry in the aperture of the female portion. The return driver is, selectively rotatable about the roll axis of the trailer drawbar, and mounted between the front of the drawbar and the rear of the tow vehicle. Further, the selectively rotatable coupler may include a selectively releasable lock. The lock locks the coupler in a fixed roll coupling position, fixed relative to rotation about the roll axis. The coupler and the lock may be mounted on the front end of the drawbar.

The alignment mechanism may also include at least one roller mounted on the pins so as to mate with the V-shaped guides on the load bearing structures.

The roll coupling lock may be adapted to be biased into locking of the roll coupling upon receipt of a locking trigger corresponding to the pre-set forward translation speed of the truck and trailer. A default locking driver may be provided to lock the lock and, again, a return driver may be provided for unlocking the lock. The locking driver may continually bias the lock into the fixed roll coupling position. The return driver return biases the locking driver into its unlocked position so as to prevent the locking of the roll coupling until the locking trigger is received, whereupon the return driver dis-engages from the return biasing of the locking driver. Again, the locking driver and the return driver may both be resiliently biased drivers, that is they may both be resilient drivers.

BRIEF DESCRIPTION OF THE DRAWINGS

In the following figures, similar characters of reference denote corresponding parts in each view.

FIG. 2 is, in perspective view, the roll coupling assembly of FIG. 1.

FIG. 2a is, in partially cutaway perspective view, the roll coupling assembly of FIG. 2 in its open position.

FIG. 2b is a view of FIG. 2a with the roll coupling assembly in its closed position.

FIG. 3 is, in perspective view, the roll coupling assembly of FIG. 2 mounted to a trailer drawbar.

FIG. 5a is, in perspective view, the female load transfer structure according to a second embodiment of the roll coupling assembly according to the present invention mounted on the rear of a tow vehicle frame.

FIG. 5b is, in perspective view, the male load transfer structure of the embodiment of FIG. 5a mounted on the front end of a drawbar.

FIG. 23b is an enlarged partially cut-away perspective view of the coupling assembly between the pintle hitches and drawbar of FIG. 23a.

FIG. 34 is, in perspective view, the roll coupling assembly of FIG. 32 with the drawbar aligned behind the tow vehicle.

FIG. 35 is, in partially exploded view, the roll coupling assembly of FIG. 34.

FIG. 52 is, in plan view, the transfer trailer dolly of FIG. 51 mounted to a trailer frame having a gravel trailer box mounted thereon.

FIG. 53 is, in side elevation view, the trailer of FIG. 52 roll coupled to a gravel truck.

FIG. 54 is, in plan view, the transfer trailer dolly of FIG. 51 with the transfer trailer dolly of FIG. 51 with the drawbar retracted.

FIG. 55 is a sectional view along line 55-55 in FIG. 54.

DETAILED DESCRIPTION OF EMBODIMENTS OF THE INVENTION

Figure 1:
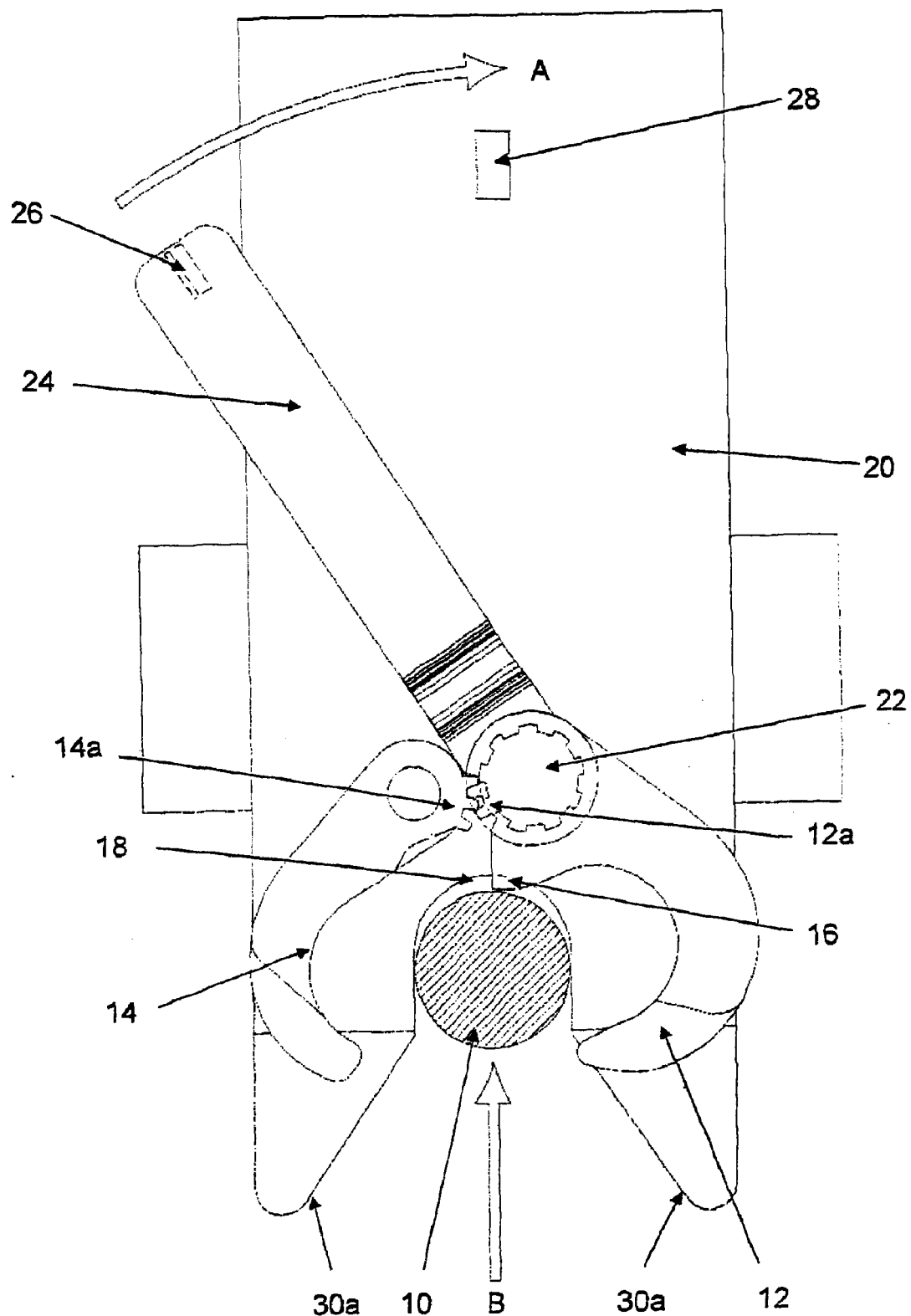
FIG. 1 is, a partially cutaway plan view of a first embodiment of the roll coupling assembly according to the present invention.

FIGS. 1 to 4 illustrate a roll coupling hitch assembly which includes a coupler that engages with a vertical pin to allow yaw and pitch rotation while providing roll coupling to resist rolling about a horizontal longitudinal axis of the trailer (not shown). FIG. 1 illustrates a top view of king pin 10 in the process of engaging with a primary jaw 12 having spur gear teeth 12a that engage with teeth 14a on a secondary jaw 14 to transmit motion as the king pin forces the primary jaw lever 16 rearward until the king pin comes to rest at the rear of the guide slot 18 in the coupler housing 20. As the primary jaw rotates clockwise around pin 22 under pressure from the king pin, as would be the case when a tow vehicle backs into the trailer drawbar 38, the handle 24 rotates clockwise in direction A to cause the latch 26 below the handle as best seen in FIG. 2 to engage with a dog 28 formed in the top surface of housing 20. This inhibits the coupler from inadvertently disengaging.

FIGS. 2a and 2b illustrate the jaw assemblies when they are open as shown in FIG. 2a and closed as shown in FIG. 2b. FIG. 2 shows the jaw assembly installed in the housing 20. The housing side plates are not shown in FIG. 2. Housing 20 includes upper and lower guide plates 30 having v-shaped entryways 30a (see FIG. 3) to self-align the coupler with kingpin 10 as the kingpin engages in the entryways during connecting in direction B the tow vehicle to the trailer. Entryways 30a provide self-aligning guides which allow coupling of the trailer to the tow vehicle on uneven ground where, otherwise, the male and female coupling structures would not readily align without for example jacking-up the trailer on the low side. It is understood that although not shown illustrated on all embodiments herein, it is intended that self-aligning guides be provided on all embodiments where for example substantially v-shaped guides may be aligned and positioned to guide lunette rings or pins onto their corresponding pintle hooks or collars respectively.

Rolling relative movement is resisted between the tow vehicle and trailer when the coupler is engaged with king pin 10. Kingpin 10 is fixed on its opposite ends to a bracket 32 that attaches in the illustrated embodiment to the tow vehicle although this is not intended to be limiting as it is intended to be within the scope of the present invention in this and the other embodiments taught herein that if it is taught that the pin is on the trailer and the receiving coupler on the tow vehicle, that the opposite arrangement is also included, for example, that the kingpin or pins be on the trailer drawbar and the receiver on the frame of the tow vehicle.

The lower platform 34 of bracket 32 is larger than the top plate to support the weight of the trailer drawbar 38 and facilitate yaw rotation when the combination tow vehicle and trailer turns a corner.

Figures 4A, 4B, 4C:
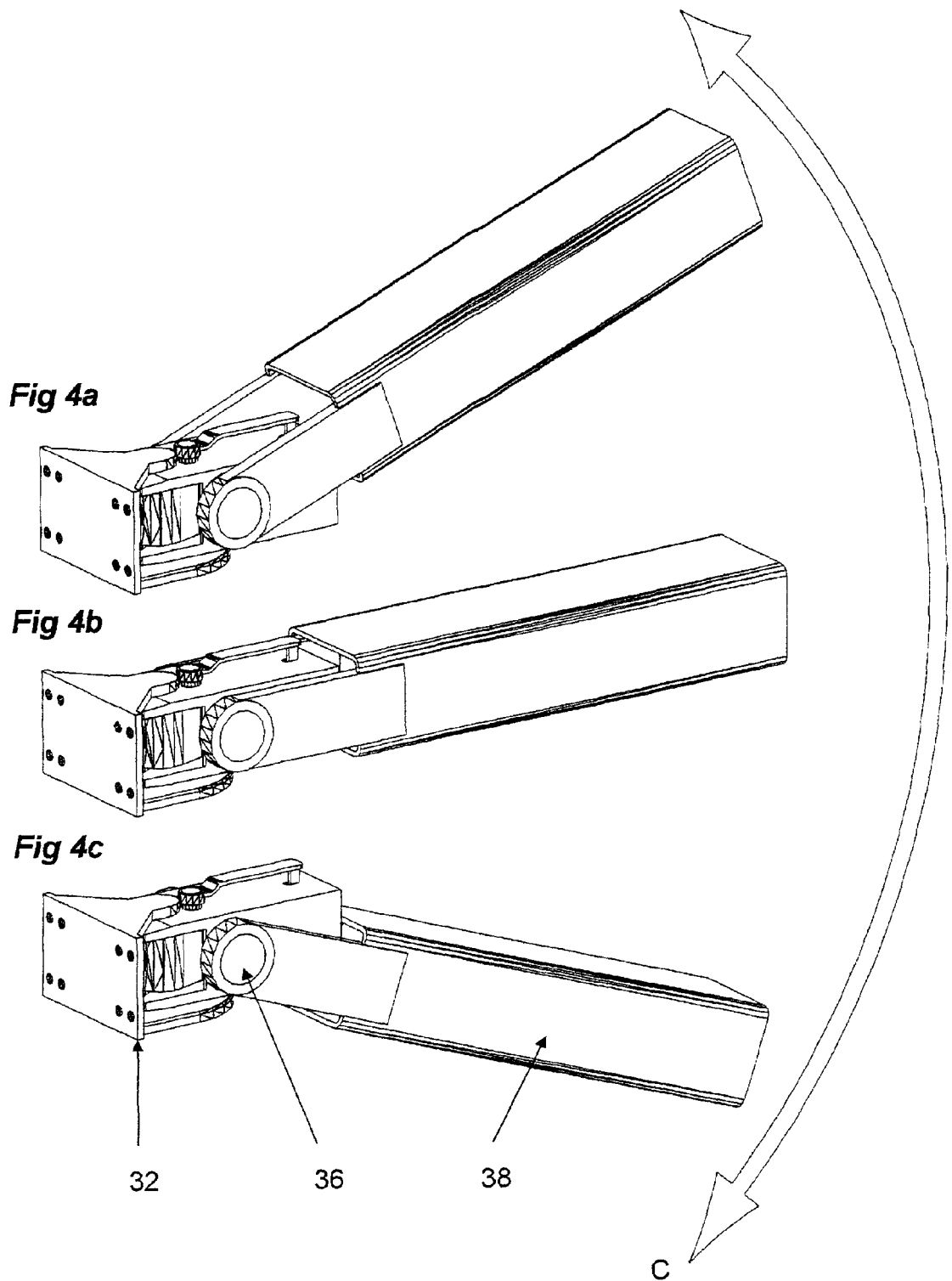
FIG. 4a is, in perspective view, the roll coupling assembly of FIG. 3 with the roll coupling assembly mounted together and the drawbar pivoted upwardly.
FIG. 4b is the view of FIG. 4a with the drawbar lowered to the horizontal.
FIG. 4c is the view of FIG. 4b with the drawbar lowered below horizontal.

FIG. 3 illustrates the housing 20 with the side plates attached. The side plates anchor the pitch rotation pins 36 on both sides of the housing. The trailer drawbar 38 is pivotally attached to the housing via pitch pins 36 so that, as seen in FIGS. 4a, 4b and 4c drawbar 38 may pitch relative to the tow vehicle in a range of motion C around the axis of pitch pin 36. The jaws are engaged with, and rotate around, the king pin 10 in bracket 32 to provide yaw rotation of the drawbar relative to the tow vehicle.

FIGS. 5 to 8 illustrate a second embodiment of roll coupling assembly according to the present invention. The coupler is attached to the tow vehicle as better described below instead of to the trailer. This embodiment is particularly suitable for trucks that have an exposed frame section at the rear of the vehicle such as logging trucks. As with the embodiment of FIGS. 1 to 4, and other embodiments taught herein, again advantageously the coupling assembly is closely adjacent the rear of the tow vehicle so as to reduce interference at the back of the tow vehicle. For example, in the first embodiment, if the tow vehicle is a dump truck then interference with a load being dumped from the truck box is minimized, that is, the load doesn't directly pour on to the coupler.

The truck frame rails 40 are attached to a rear cross member 42 that is used to hold the hitch bracket 44 in place. The hitch bracket may be attached directly to the cross member or alternatively it may be cushioned with rubber blocks 46 to absorb shock and permit limited movement to avoid stressing hitch components when operating in rough terrain. However it is attached, the bracket provides upper and lower guide plates 30 again with v-shaped guides 30a to self-align the coupler with the king pin 10 when the tow vehicle is being connected to the trailer and to resist relative rolling movement about longitudinal axis D (FIG. 8) between the tow vehicle and trailer. Someone skilled in the art would know of many different ways to lock the trailer king pin(s) 10 within the neck 30b of guide plates 30 without restricting yaw movement. In this embodiment, two jaws 48 are provided in locking device 50. Locking device 50 holds the jaws open or closed. When open, the jaws do not obstruct guides 30a or neck 30b. As seen in FIG. 5b, the forward end of the trailer drawbar 38 has kingpin 10 mounted vertically thereon. Kingpin 10 runs vertically through a metal block 52 that also houses the pitch pin 36 to provide pitch rotation of the drawbar about the pitch pin axis.

Figure 6:
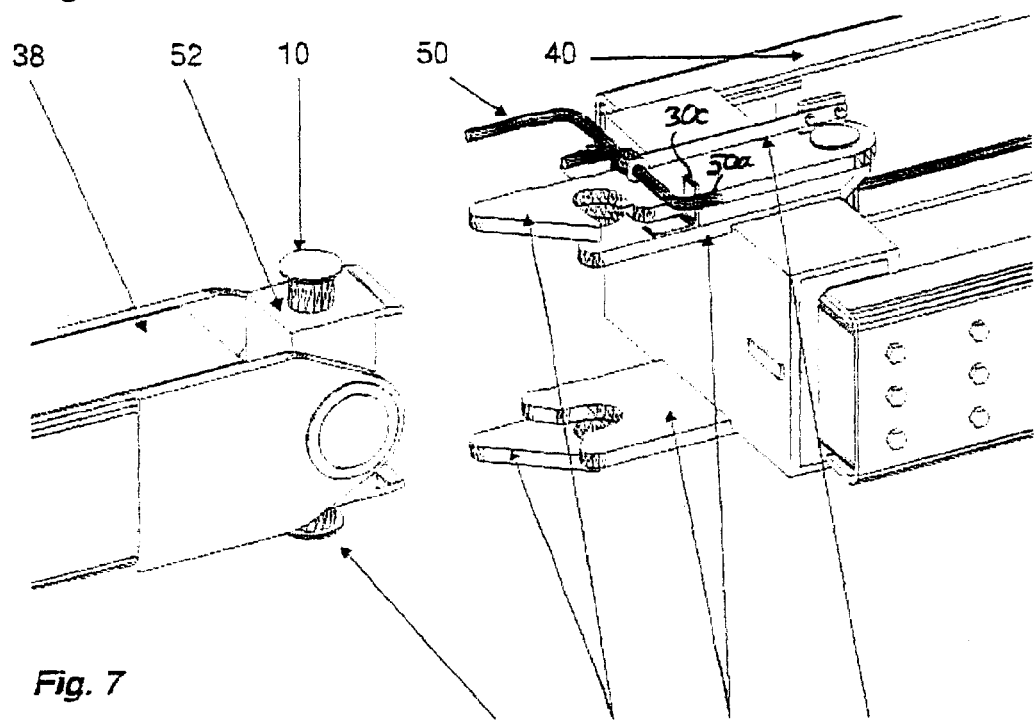
FIG. 6 is, in perspective view looking towards the rear of the tow vehicle, the roll coupling assembly of FIGS. 5a and 5b.
Figure 7:
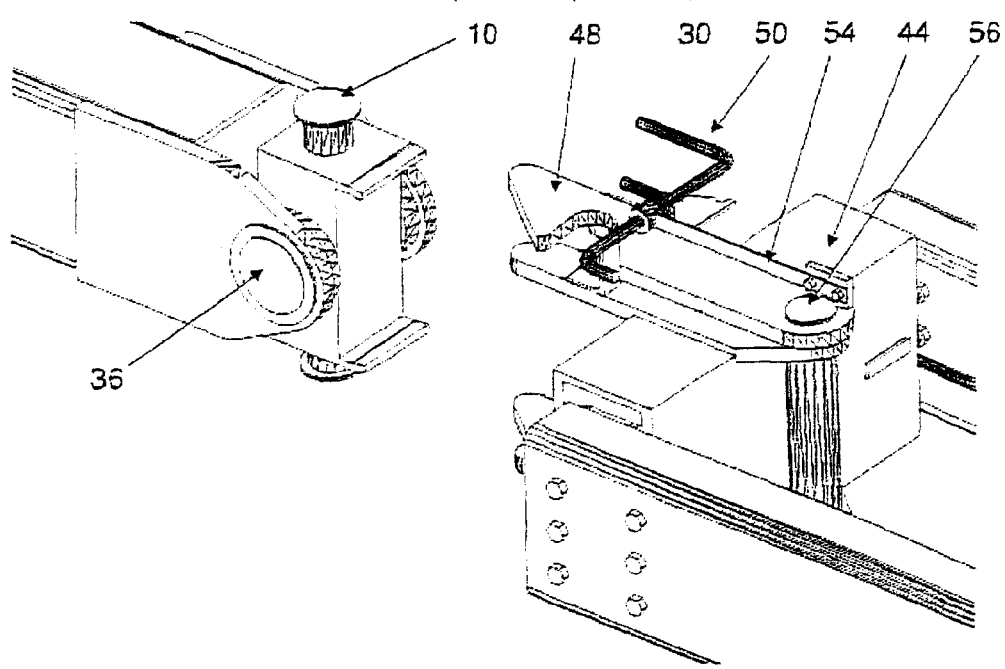
FIG. 7 is the roll coupling assembly of FIG. 6 in perspective view looking at the front of the drawbar.

FIGS. 6 and 7 further illustrate the hitch assembly of FIG. 5. The jaw locking mechanism is shown in both views. The lock handle 50 rotates in direction G within a pin boss 51 attached to the distal end of a leaf spring 54 so as to unhook arm 50a from behind bracket 30c. Spring 54 is attached at its opposite end to the upper jaw 48 by means of bracket 54a. Moving and locking the handle 50 in either direction E deflects the spring in direction F applying spring pressure on to upper jaws 48 to either open or close. Both jaws are rigidly connected via pin 56 so operation of upper jaw 48 simultaneously operates lower jaw 48. The upper jaw 48 is held open by engaging arm 50b within latch 30d by pulling back on, and rotation of handle 50.

Figure 8:
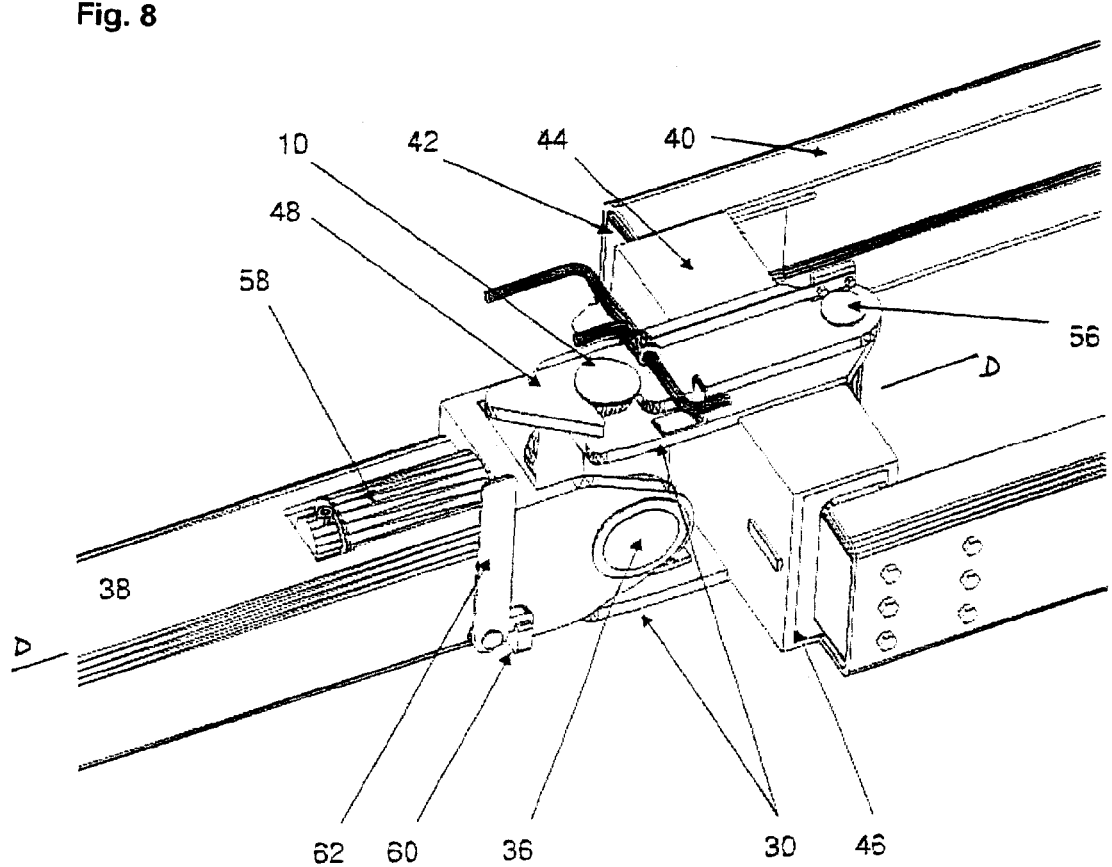
FIG. 8 is a further embodiment of the roll coupling assembly of FIG. 7 wherein the male load transfer structure is selectively rotatable about the roll axis of the drawbar.

FIG. 8 illustrates the trailer drawbar attached to the tow vehicle frame. The drawbar in this embodiment however provides a means of selectively disabling the roll coupling to allow for roll rotation about roll axis (longitudinal axis) D. The drawbar is allowed to roll about roll axis pin 58 when the locking mechanism 60, latching located on both sides of the drawbar, is disengaged by rotating the control handle 62 rearwardly. This is useful for an operator where the tow vehicle and trailer are knowingly going to be driven, usually slowly, over rough terrain where if the roll coupler were not de-coupled damage might occur to the coupler, frame of the trailer, and/or frame of the tow vehicle.

The third roll coupling assembly of FIGS. 9 to 12 illustrates how a single hitch assembly may be utilized with safety chains or the like to achieve roll coupling.

FIG. 9 again illustrates the end of a tow vehicle (truck or trailer) frame 40 and a cross member 42. In this embodiment a pintle hook coupling 64 is mountable to the cross member 42. The cross member 42 also has two slotted arms 66 extending therefrom. The trailer drawbar 38 assembly is connected with the tow vehicle by engaging a lunette ring 68 mounted on the drawbar with the pintle coupler 64. A pair of oppositely disposed ears 72a are mounted to the drawbar under the lunette ring. The drawbar ears 72a are attached to the slotted arms 66 using chains 70 and hooks 74. The ears 72a are mounted to the lower part of the drawbar directly below the center of the lunette ring by a swivel bracket 72. Swivel bracket 72 rotates in direction H about pin 72b when the tow vehicle turns a corner. The lower ends of the chains are mounted to the ears. The upper ends of the chains are attached to hooks 74. Hooks 74 engage in slots 66a in slotted arms 66 as the drawbar lunette ring is being lowered over the hook 64a of the pintle coupler 64 while the trailer is being connected to the tow vehicle.

Figure 9:
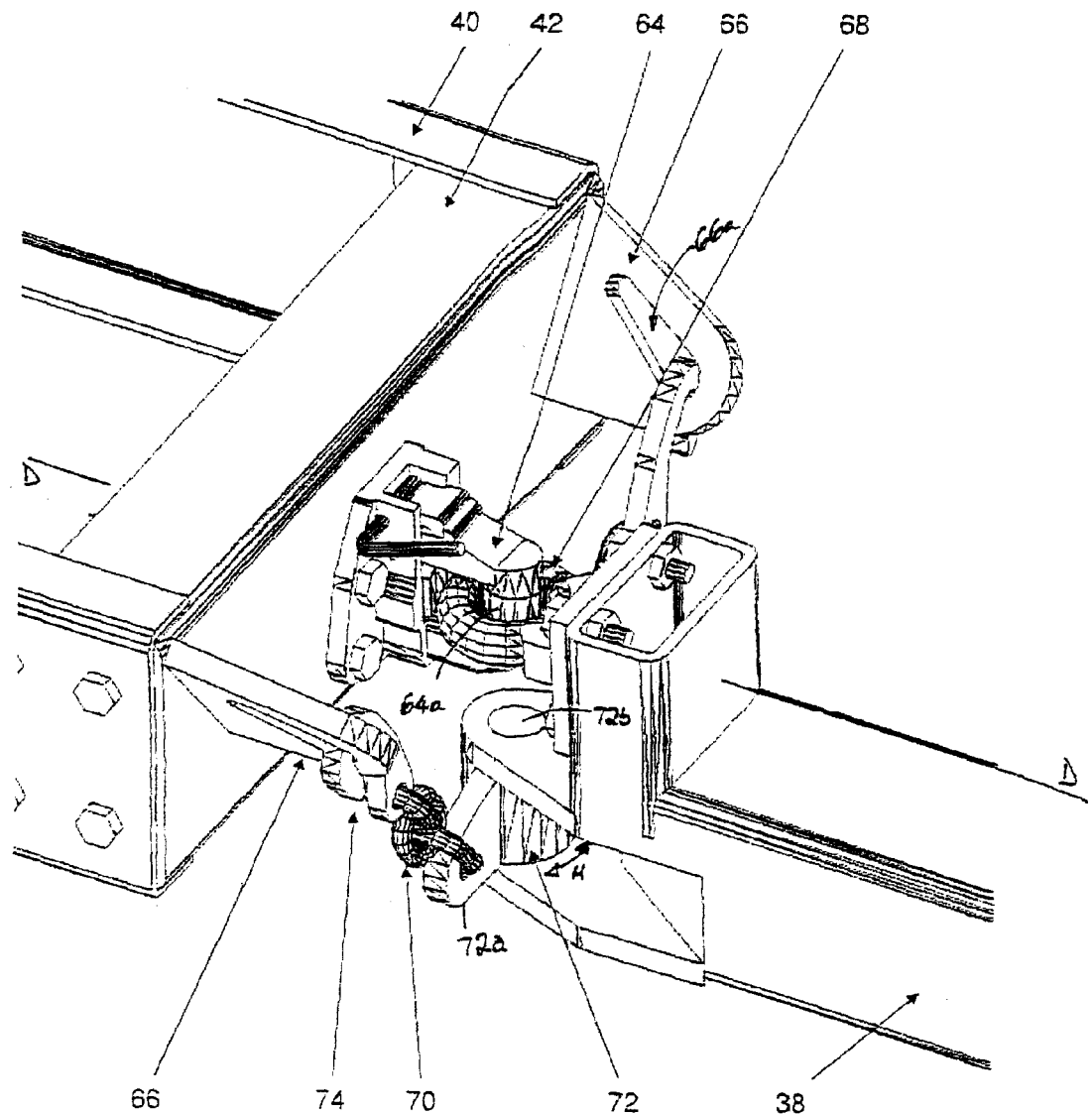
FIG. 9 is, in perspective view, a further embodiment of the roll coupling assembly according to the present invention.
Figure 10:
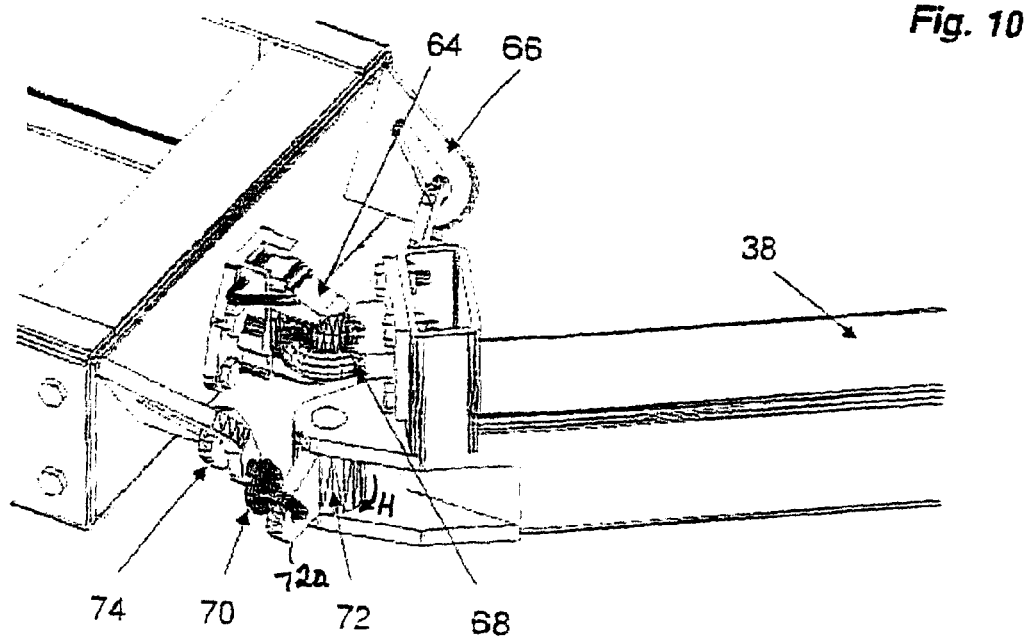
FIG. 10 is, in perspective view, the roll coupling assembly of FIG. 9 with the drawbar rotated in a horizontal plane.

FIG. 10 illustrates the components of FIG. 9 as they would appear when the tow vehicle and trailer are making a turn. The chain swivel bracket 72 has rotated in direction H within a slot on the lower forward end of drawbar 38. The rotation of bracket 72 avoids stressing chains 70 and hooks 74.

The chains 70 illustrated in FIGS. 9 and 10 are of sufficiently short length so as to be tight to thereby resist roll movement about axis D between the tow vehicle and trailer. These chains can alternatively be attached directly to the drawbar on trailers operating in jurisdictions where more roll movement is permitted by law.

Figure 11:
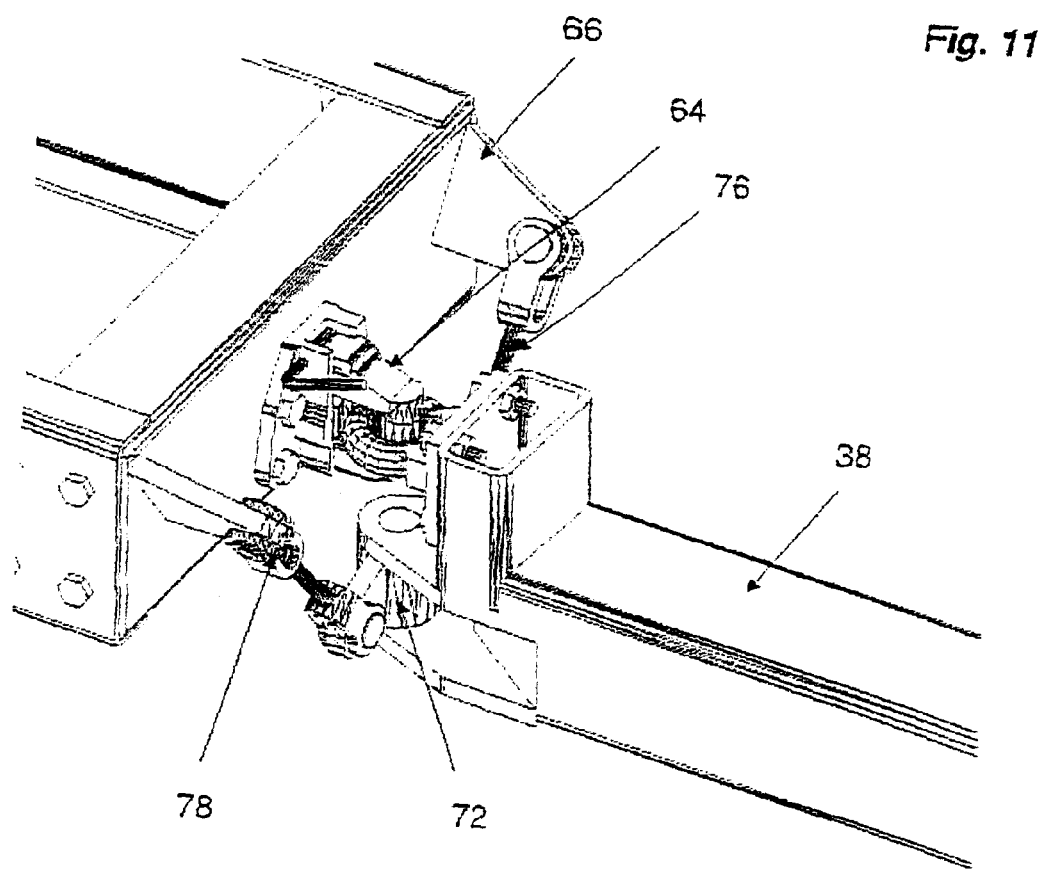
FIG. 11 is, in perspective view, a further alternative embodiment of the roll coupling assembly of FIG. 9.
Figure 12:
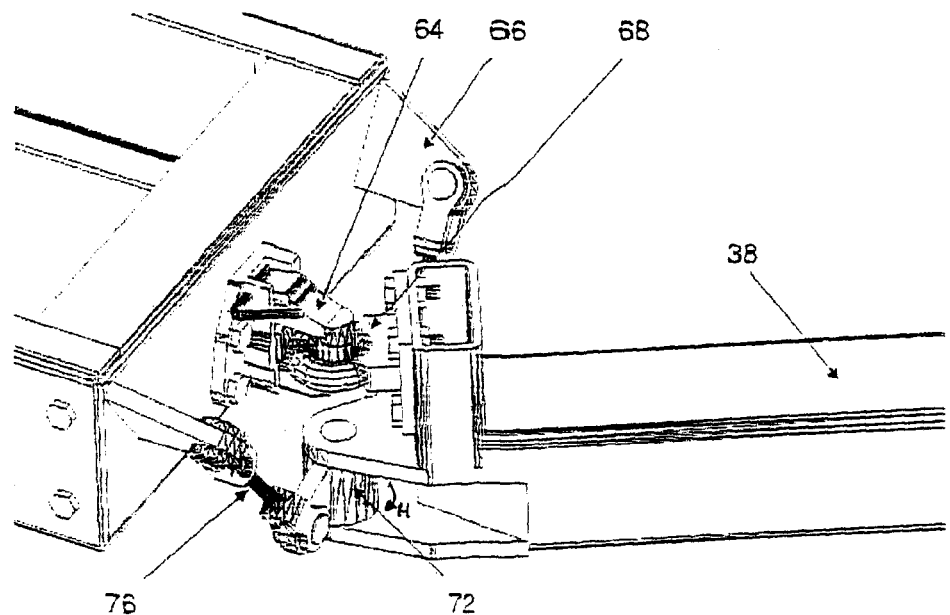
FIG. 12 is, in perspective view, the roll coupling assembly of FIG. 11 with the drawbar rotated in a horizontal plane.

FIG. 11 illustrates an alternative arrangement substituting link rods 76 for chains 70. Link rods 76 are pinned to arms 66 and swivel bracket 72 using adjustable yokes 78. FIG. 12 illustrates the alternative arrangement of FIG. 11 as it would appear when the tow vehicle is making a turn. Again swivel bracket 72 has rotated relative to the lower forward end of drawbar 38 to avoid stressing the link rods 76.

The roll coupling embodiments of FIGS. 13 to 19 provide two or more vertically aligned hitches to reduce the amount of trailer weight loaded on each hitch and to resist horizontal shear forces acting on the hitches resulting from roll coupling the trailer to the tow vehicle.

Figure 13:
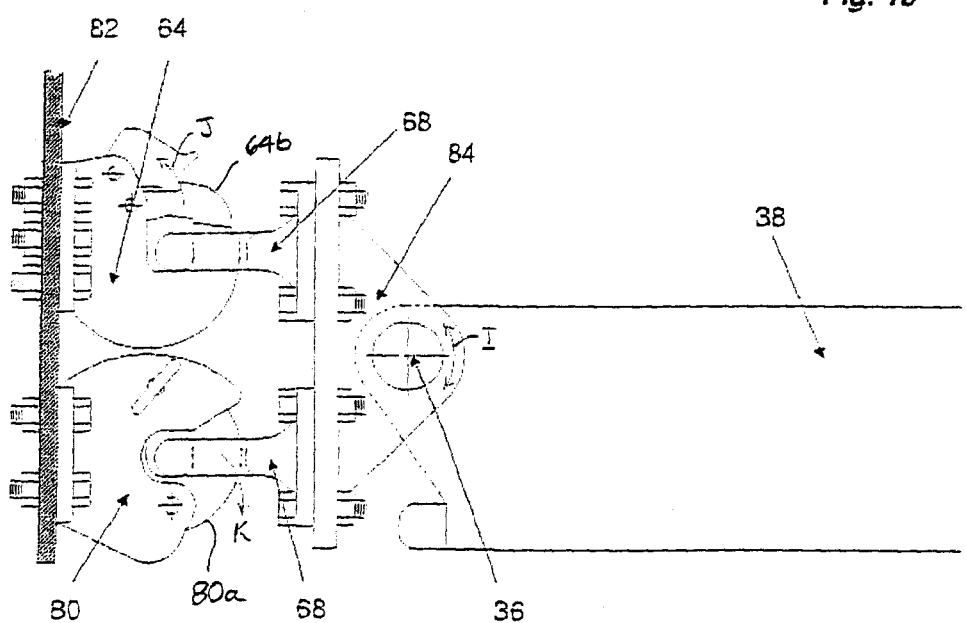
FIG. 13 is, in left side elevation view, a further embodiment of the roll coupling assembly according to the present invention.

FIG. 13 illustrates, as an example, a vertically aligned combination of a pintle hook 64 and a drop-pintle coupling 80 mounted to a truck towing apron 82. Lunette rings 68 are mounted on trailer drawbar 38 by pitch plate 84. Pitch plate 84 is pivotally mounted on the end of drawbar 38 providing pitch rotation in direction I around pitch pin 36. Lunette rings 68 mount into hook 64 and coupling 80. Hook 64 is opened by lifting the closing arm 64b in direction J. Coupling 80 is opened by unlatching and dropping hook 80a in direction K.

Figure 14:
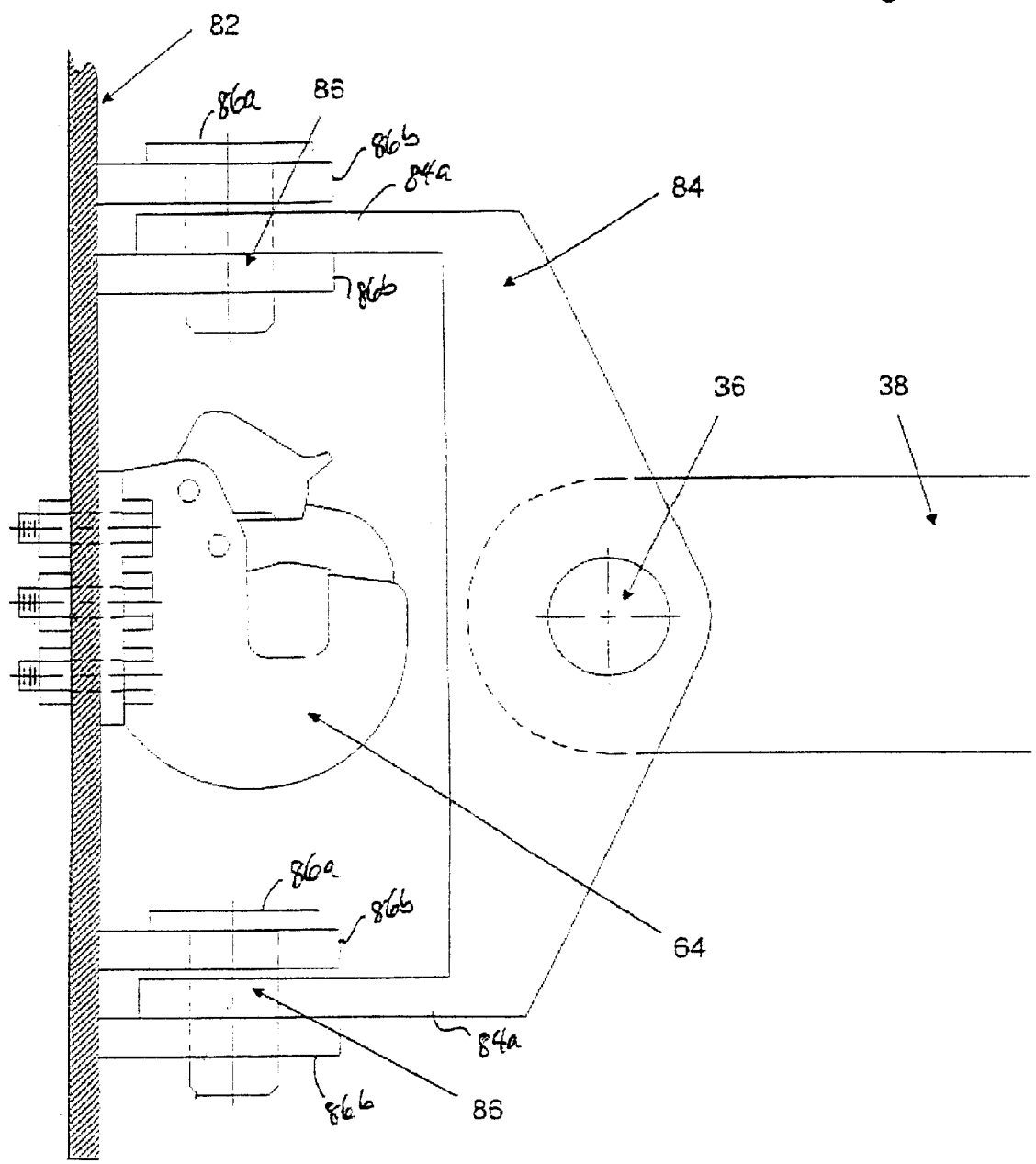
FIG. 14 is, in left side elevation view, yet a further embodiment of the roll coupling assembly according to the present invention.

FIG. 14 illustrates how another vertically aligned hitch arrangement may be used to employ two pinned couplers 86 above and below a pintle coupler 64 attached to towing apron 82 such as would be found on a dump truck equipped for towing a tandem axle pony trailer. Pins 86a are journalled downwardly through vertically aligned eyes in collars 86b and through a corresponding eye in each arm 84a on pitch plate 84 interleaved between each pair of collars 86b. Pitch plate 84 is pinned at 36 to allow pitch motion.

Figure 15:
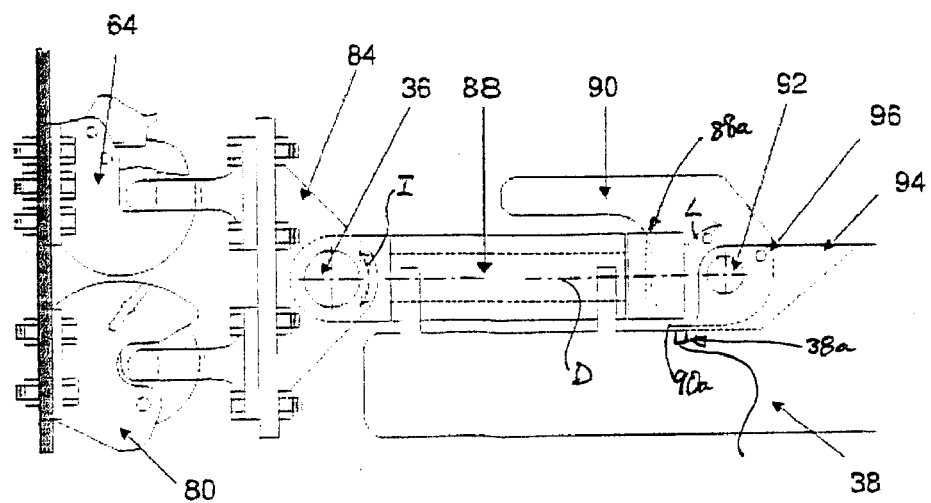
FIG. 15 is, in left side elevation view, the roll coupling assembly of FIG. 13 adapted to provide selective roll rotation of the coupling assembly relative to the drawbar.

FIG. 15 illustrates a combination of a pintle hook 64 and a drop-pintle coupling 80 connected to a trailer drawbar 38 via pitch plate 84 that is pinned by pitch pin 36 to a longitudinal roll axis pin 88. Pin 88 may be locked to prevent roll motion or released to allow for roll motion about axis D to selectively provide roll coupling when desired by an operator, for example when travelling on a highway. In the example of a lock for pin 88, a roll lockout handle 90 rotates vertically in direction L around a pin 92 passing through the lockout handle 90 and trailer drawbar bracket 94 to disengage the locking flange 90a of lockout handle 90 from a slot 88a in the end of the roll axis pin 88 for off-road use of the tow vehicle and trailer. A safety pin 96 may be inserted through the lockout handle bracket 94 attached to the trailer drawbar 38 and lockout handle 90 to hold the lockout handle in either its open or closed position.

A proximity sensor or electric switch (such as sensor 38a) in FIG. 15 should be provided to activate a warning device in the cab of the tow vehicle so as to alert the operator that the roll coupling lock has not been engaged.

Figure 16:
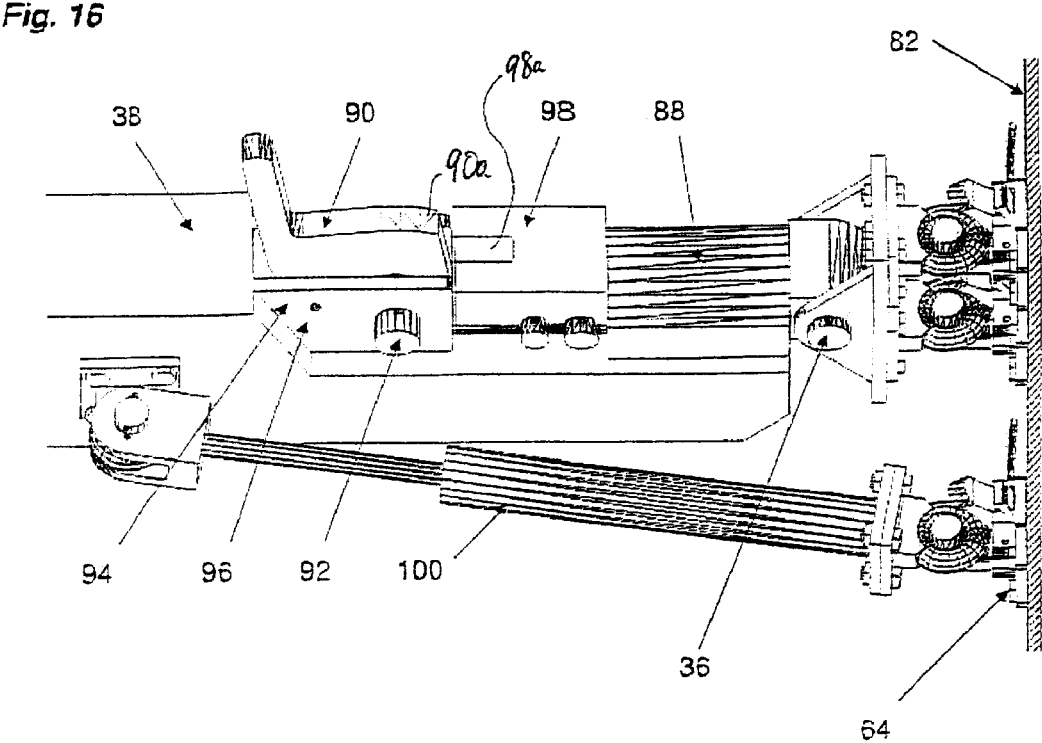
FIG. 16 is, in perspective view, a further embodiment of a roll coupling assembly according to the present invention.

In FIG. 15 the roll lockout handle 90 is illustrated in the locked position. In FIG. 16 the handle 90 is illustrated disengaged from slot 98a in a roll swivel pin assembly 98 mounted on roll axis pin 88 to provide unrestricted roll movement when operating the vehicle off road on rough and uneven terrain.

FIG. 16 illustrates the roll coupling assembly of FIG. 15 with the addition of a yaw dampening cylinder 100 pivotally attached to drawbar 38 and connected to a second pintle coupler 64 attached to tow apron 82 laterally offset from the first pintle coupler 64 and coupling 80 so as to control rearward amplified sway around the yaw axis on combination vehicles having multiple trailers such as those known conventionally as "A" trains and triples.

Figure 17:
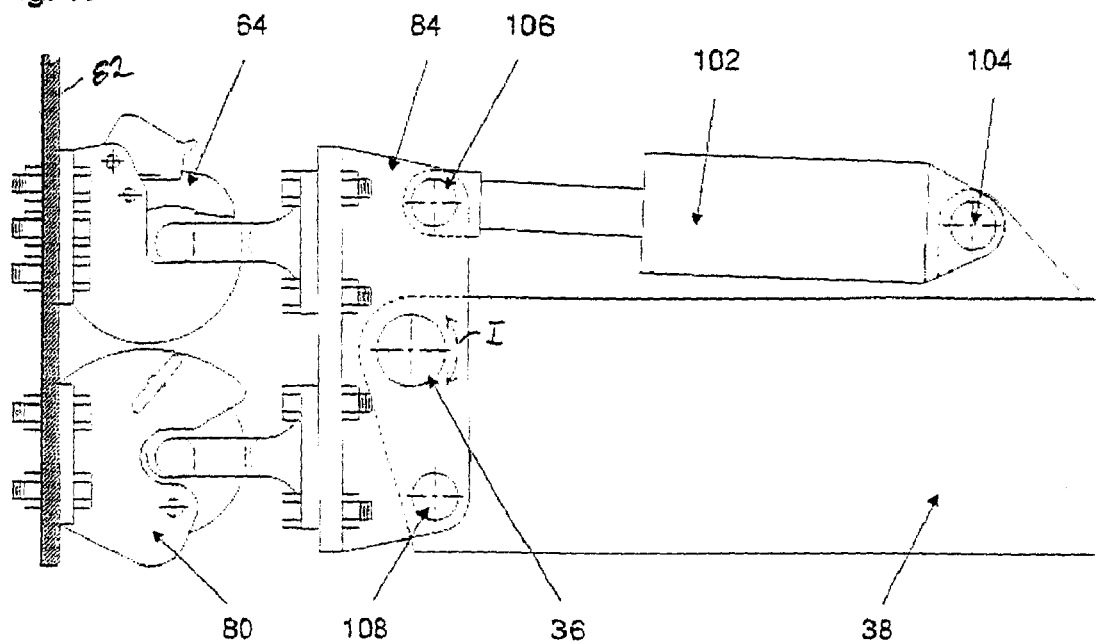
FIG. 17 is a variant of the roll coupling assembly of FIG. 13 illustrated in left side elevation view.

There are concerns in the trucking industry regarding the loss of steering tire friction on tri-drive trucks when the frame is loaded aft of the driving axles. FIG. 17 illustrates a fluid cylinder such as pneumatic cylinder 102 that is pivotally anchored to the trailer drawbar 38 by pin 104. The cylinder 102 is pivotally connected to the pitch plate bracket 84 by pin 106 to apply forward pressure on the upper coupler 64 when the cylinder is sufficiently charged to transfer weight forward of the driving axle group to the steering axle of the tow vehicle such as the steering axle of a ti-drive truck.

On occasion it may be necessary to move a trailer with a tow vehicle that is not equipped for roll coupling. A pin 108 may be inserted through an aperture in the pitch plate bracket 84 and through trailer drawbar 38 to prevent pitch rotation around pitch pin 36 when the trailer is attached to a tow vehicle that is equipped with only one coupler.

Figure 18:
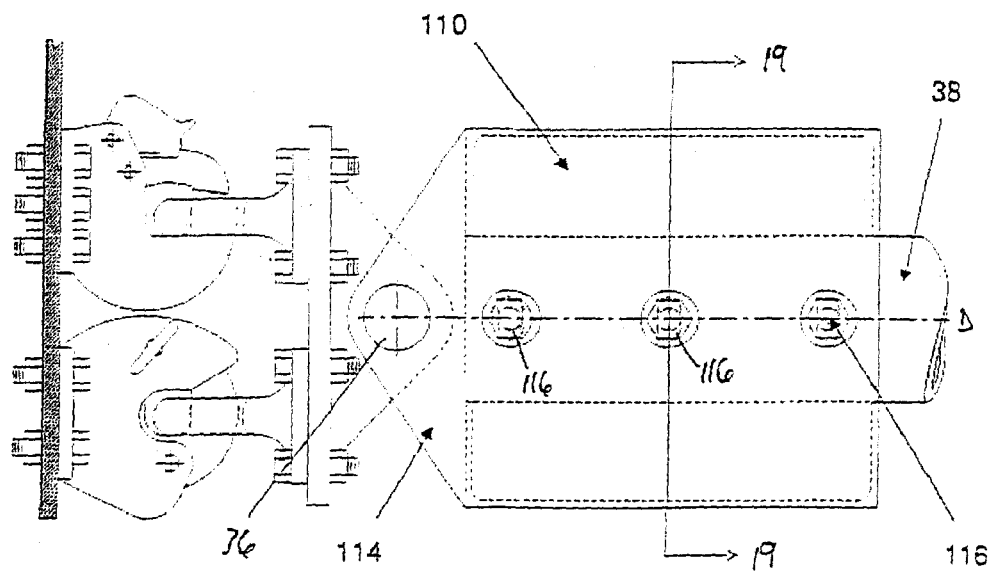
FIG. 18 is a further variant of the roll coupling assembly of FIG. 13 illustrated in left side elevation view.
Figure 19:
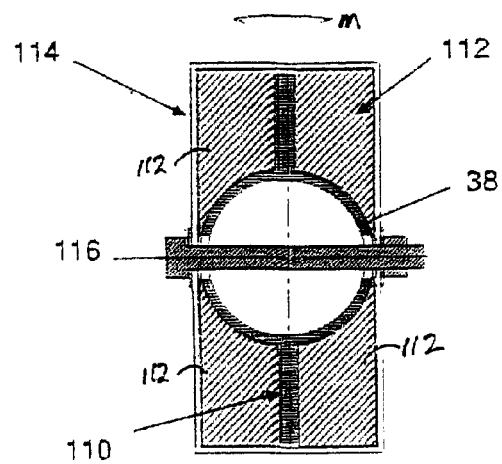
FIG. 19 is a cross sectional view along line 19-19 in FIG. 18.

FIG. 18 illustrates a means of cushioning torsional shock and restricting roll rotation on torsionally rigid trailers. The drawbar 38 has two vertical plates 110 attached at the upper and lower quadrants of the round tube of the drawbar 38 to apply pressure on the four rubber blocks 112 contained inside the shock dampening roll housing 114 as better seen in the sectional view of FIG. 19 when rotational movement occurs around the roll axis D in the center of the drawbar tube 38. The four rubber blocks 112 are provided to cushion and resist roll rotation in direction M of the drawbar assembly 38 within the confines of the roll housing 114. The housing assembly is held in place using three or more mounting bolts 116 passing through slotted holes in the drawbar 38 to prevent excessive roll rotation. It is understood that a variety of methods for reducing torsional shock and strain may be employed by someone skilled in the art and that cushioning the mounting bracket on the tow vehicle could alternatively provide similar torsional stress relief.

The coupling embodiments of FIGS. 20 to 26 illustrate how two or more horizontally aligned hitches may be used to achieve the roll coupling according to the present invention.

Figure 20:
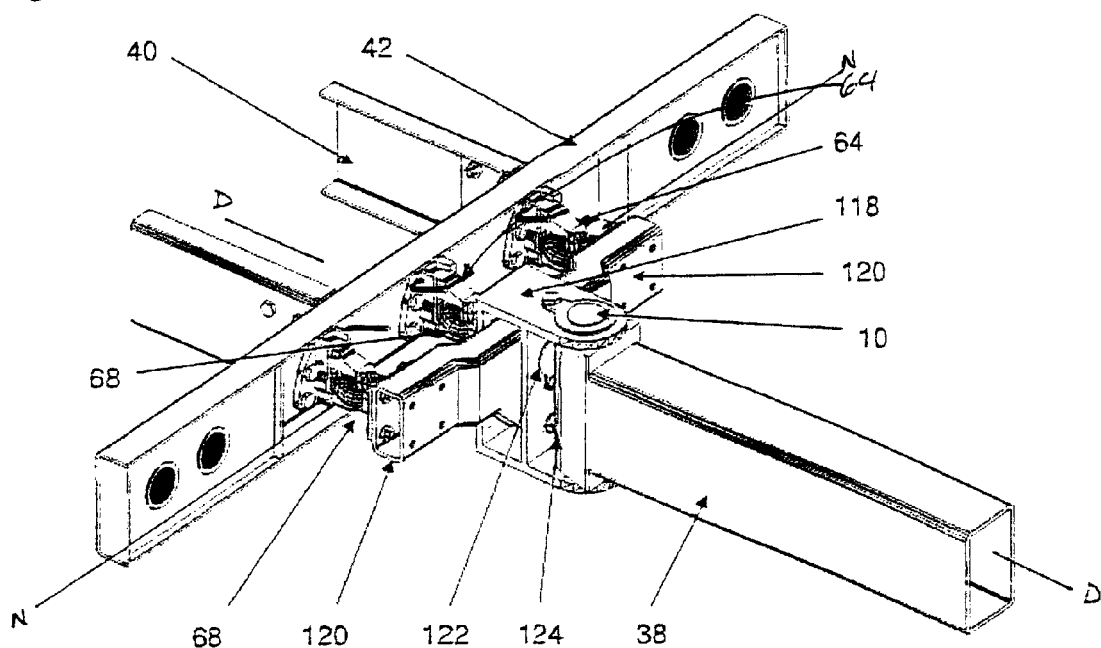
FIG. 20 is, in perspective view, a further embodiment of a roll coupling assembly according to the present invention.

FIG. 20 illustrates three pintle hook couplers 64 mounted to the end of a truck or trailer frame 40 and in particular to cross member 42. The center pintle hook connects with the centre lunette ring 68. The centre lunette ring 68 is mounted to housing 118. Beam 120 is mounted to housing 118 by roll axis pin 122 for rotation about axis D. Pin 124 is mounted through corresponding apertures in housing 118 and beam 120 to prevent roll rotation about pin 122. Pin 124 may be removed to allow roll rotation. The beam 120 has a laterally spaced apart pair of lunette rings 68 attached to the front of each end of beam 120 to engage with the corresponding pintle couplers 64 attached laterally spaced apart on the tow vehicle. The three horizontally aligned pintle couplers 64 allow pitch rotation about axis N. The trailer drawbar 38 is pivotally connected to the housing 118 by kingpin 10 to provide yaw rotation around king pin 10.

Figure 21:
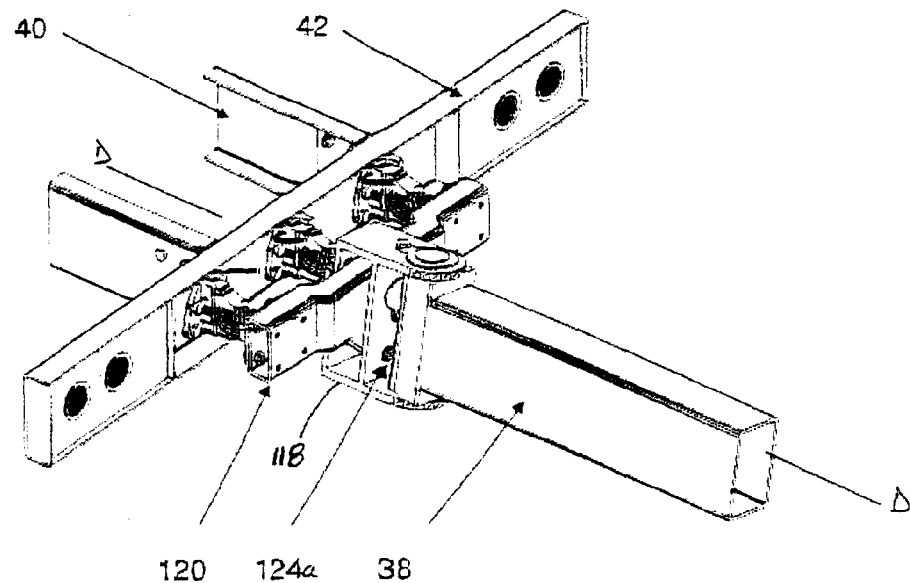
FIG. 21 is, in perspective view, the roll coupling assembly of FIG. 20 with the drawbar rolled about the drawbar roll axis.
Figure 22:
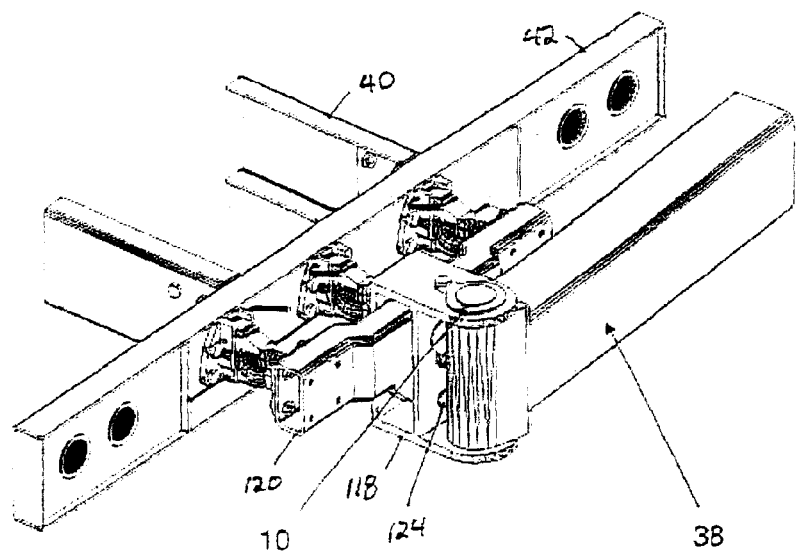
FIG. 22 is, in perspective view, the roll coupling assembly of FIG. 20, with the drawbar rotated in a horizontal plane.

FIG. 21 illustrates the components of FIG. 20 as they would appear with pin 124 removed from its aperture 124a in housing 118 and the drawbar 38 rolled to the right about axis D. FIG. 22 illustrates those same components with pin 124 replaced as they would appear when the tow vehicle and trailer are making a very sharp right turn or the tow vehicle is backing up and jack-knifing the trailer to the right so as to rotate the drawbar about the kingpin.

Figure 23A:
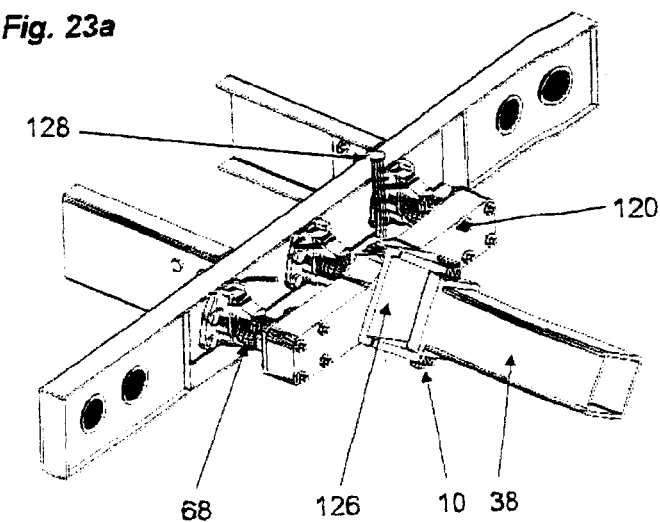
FIG. 23a is, in perspective view, a variant of the roll coupling assembly of FIG. 20.
Figure 23B:
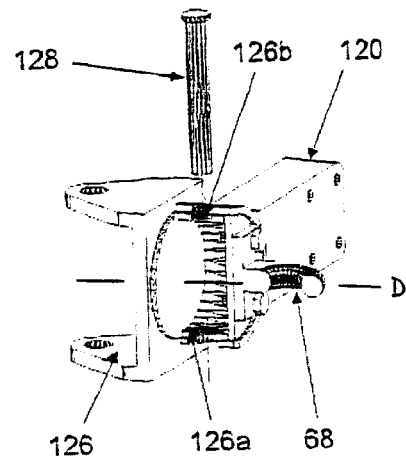

FIG. 23a illustrates a further alternative embodiment. A shaft 126a (shown in FIG. 23b) runs along axis D through beam 120. The centre lunette ring 68 is mounted to the front of shaft 126a and yoke 126 is mounted to the rear end. Yoke 126 is thus pivotally mounted to beam 120 for rotation around axis D and pivotally mounted to drawbar 38 by kingpin 10 to provide yaw rotation around kingpin 10. A pin such as 128 may be journalled through aperture 126b when aligned with a corresponding aperture in beam 120 so that pin 128 is inserted through both apertures when yoke 126 is vertical so as to selectively lock yoke 126 to prevent roll rotation and thus provide roll coupling. As is the case with other embodiments, the hitch assembly may be symmetrical as shown for example in FIG. 23a or asymmetric (that is, extending only to one side of axis D) as illustrated in FIG. 23b.

Figure 24:
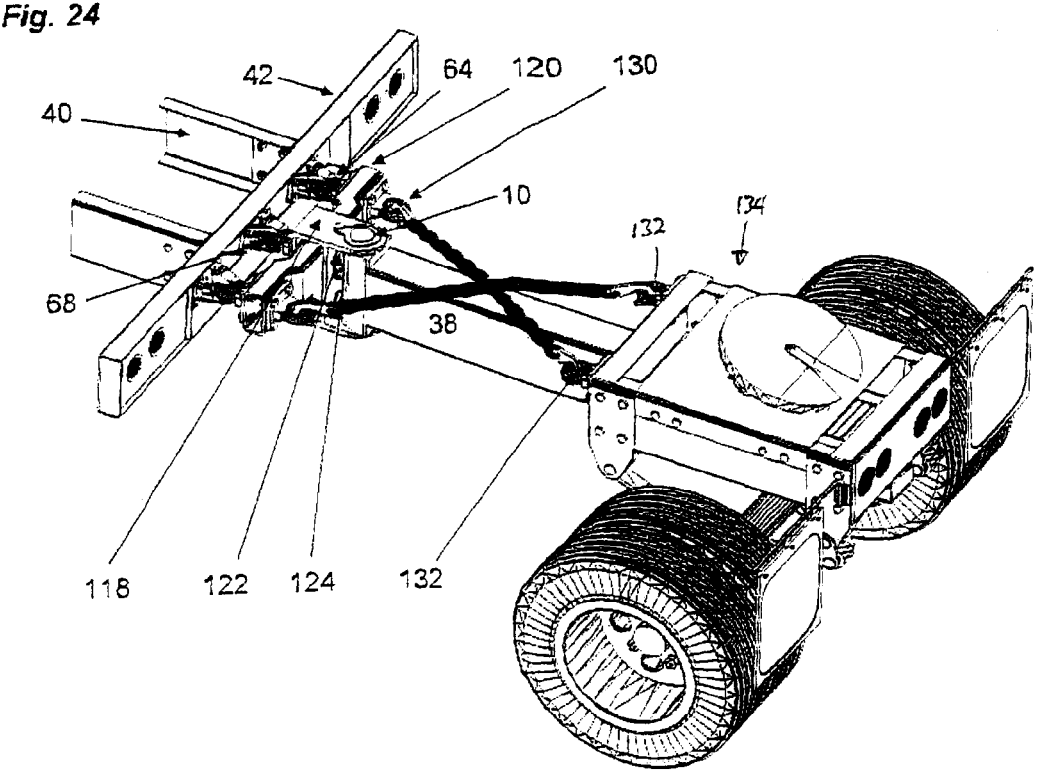
FIG. 24 is, in perspective view, the roll coupling assembly of FIG. 20 mounted to a dolly.
Figures 25, 26:
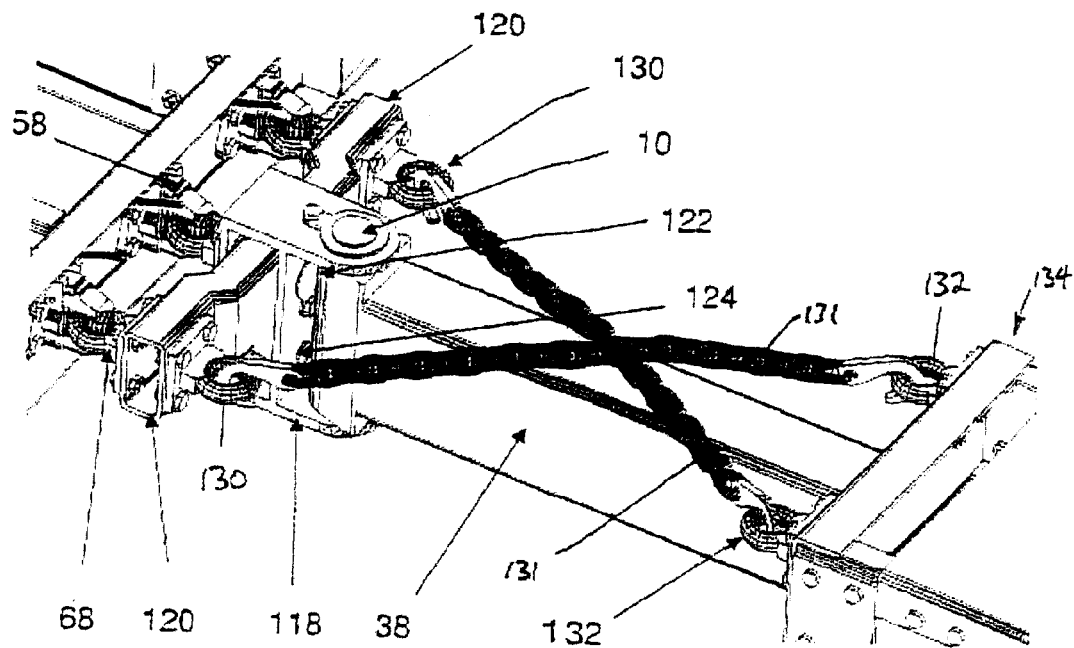
FIG. 25 is an enlarged view of a portion of FIG. 24.
FIG. 26 is, in perspective view, the roll coupling assembly and dolly of FIG. 24 with the drawbar and dolly rotated in a horizontal plane.

FIGS. 24 to 26 illustrate how horizontally aligned hitches may be used to roll couple an "A" train dolly.

FIGS. 24 and 25 illustrate the roll coupling assembly of FIG. 20 mounted to the rear end of a tow vehicle (truck or trailer) frame 40 on cross member 42. A second pair of lunette rings 130 are mounted laterally spaced apart to the back of beam 120. Yaw rotation about kingpin 10 may be selectively prevented by attaching a pair of criss-crossed chains 131 or other elongate mechanical bracing means diagonally between lunette rings 130 and a third pair of lunette rings 132 mounted on the dolly frame 134. The chains are removed when it is desired to travel and provide for yaw rotation about kingpin 10 as seen in FIG. 26.

Some tuck/trailer combinations use $5^{th}$ wheels mounted aft of the truck frame to attach the trailer to the truck. $5^{th}$ wheel hitches are bulky and their design inherently provides roll coupling between two vehicle units. One disadvantage of using $5^{th}$ wheels in this configuration is that the excessive hitch offset distance decreases yaw stability and steering traction. A second disadvantage is that the truck and trailer frames are unnecessarily stressed when operating the vehicle on uneven terrain and a third disadvantage is that it is difficult to connect and disconnect the trailer on uneven terrain.

Figure 27:
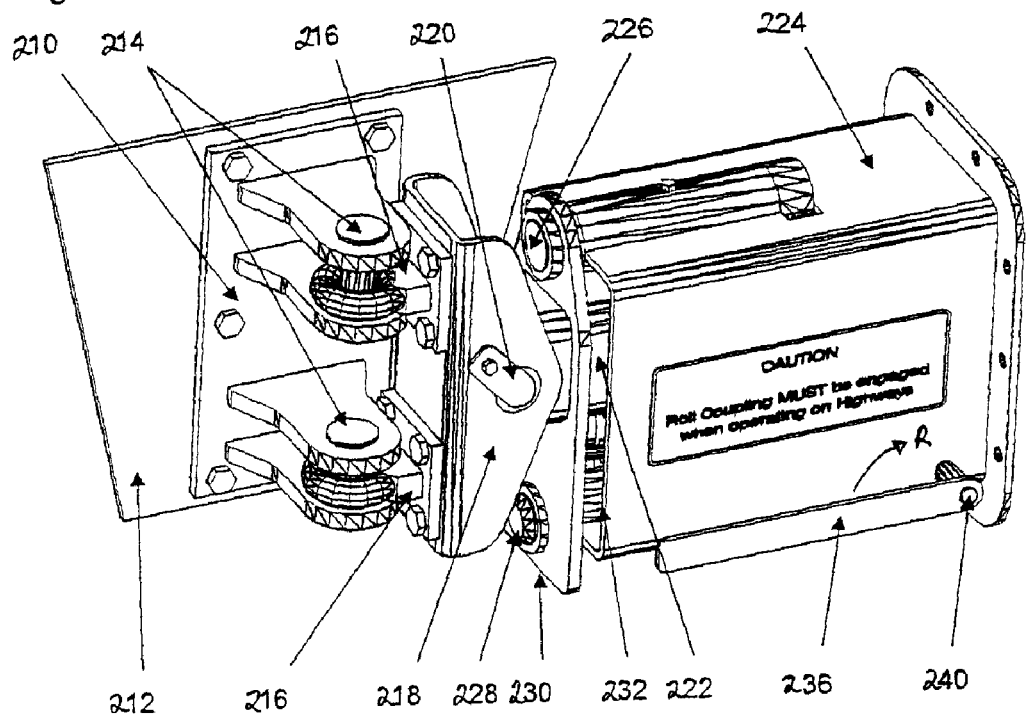
FIG. 27 is, in perspective view, a further embodiment of the roll coupling assembly according to the present invention, with the drawbar rotated in a horizontal plane.

FIG. 27 illustrates a truck hitch assembly 210 that could be attached to the rear of a truck via a towing apron 212. The truck hitch assembly is connected to a trailer hitch assembly via two vertical pins 214 to provide yaw rotation and the trailer hitch assembly will in turn be attached to the front of a trailer drawbar. The trailer hitch in this illustration is connected to the truck hitch assembly via pins 214 passing through two lunette rings 216 that are attached to a pitch bracket 218 that rotates around a pitch pin 220. The pitch pin connects the pitch bracket to the roll bracket 222 that is pivotally attached to the roll housing 224 via roll pin 226. The roll assembly rotates in direction P about axis of rotation Q up to 15 degrees in either direction suspended on plates 230 and 231 within the confines of the roll housing. Plates 230 and 231 are mounted to collars 230a and 231a respectively. The pin 226 is journalled through the collars and through sleeve 226a extending therebetween. Sleeve 226a is welded to top plate 224b of housing 224. The roll assembly may be selectively locked in a vertical position by engaging roll lockout pin 228 with the front plate 230 of the roll assembly. The roll lockout pin 228 slides horizontally through sleeve 232 that is welded in forward end of the lower plate 224a of the roll housing. Linkage 234 connects the roll lockout pin 228 to the roll lockout handle 236 via a roll lockout arm 238 and axle 240. Rotating handle 236 in direction R rotates axle 240 and arm 238 in direction R' thereby draining linkage 234 in direction R". Pulling linkage 234 in direction R" compresses spring 234a against slide 234b thereby urging slide 234b in direction S. Slide 234b is connected to pin 228. Pin 228 thus is extracted from plate 230 as the slide moves in direction S. The return of handle 236 urges pin 228 to re-engage plate 230 under the return biasing force of spring 234c.

Figure 28:
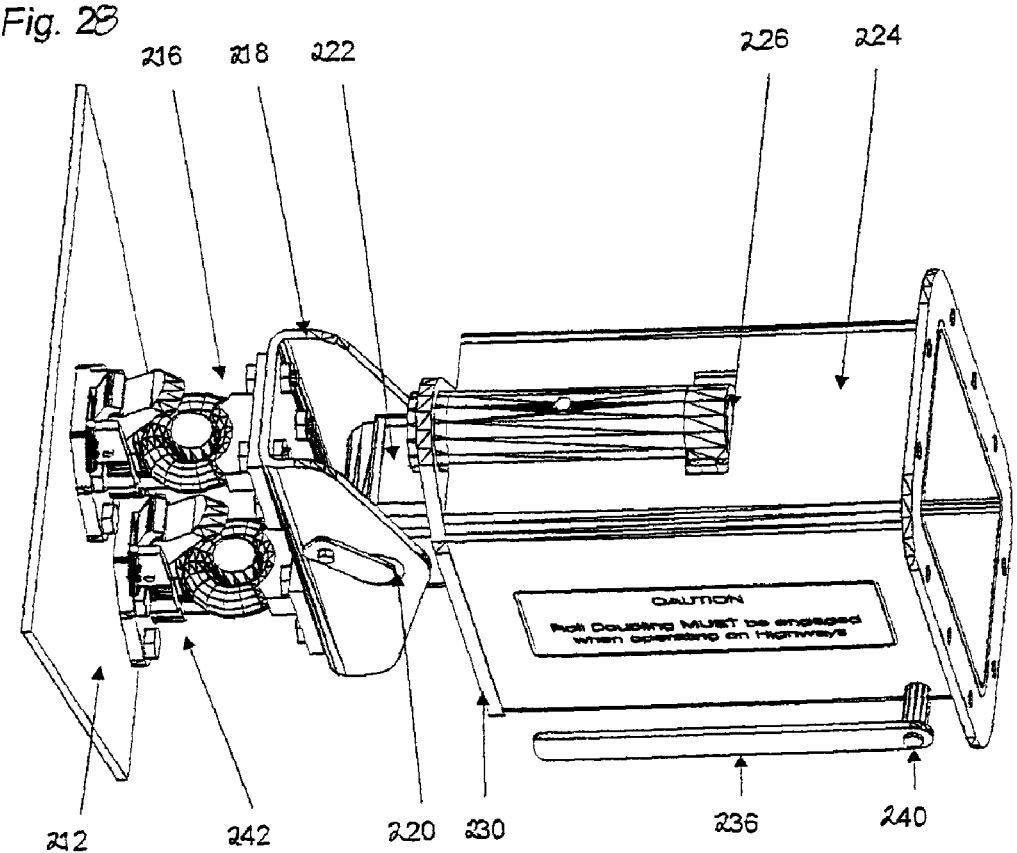
FIG. 28 is the roll coupling assembly of FIG. 27 with the drawbar aligned behind the tow vehicle.

FIG. 28 illustrates another view with an alternative hitch configuration using two pintle couplers 242 in place of the hitch assembly 210.

Figure 29:
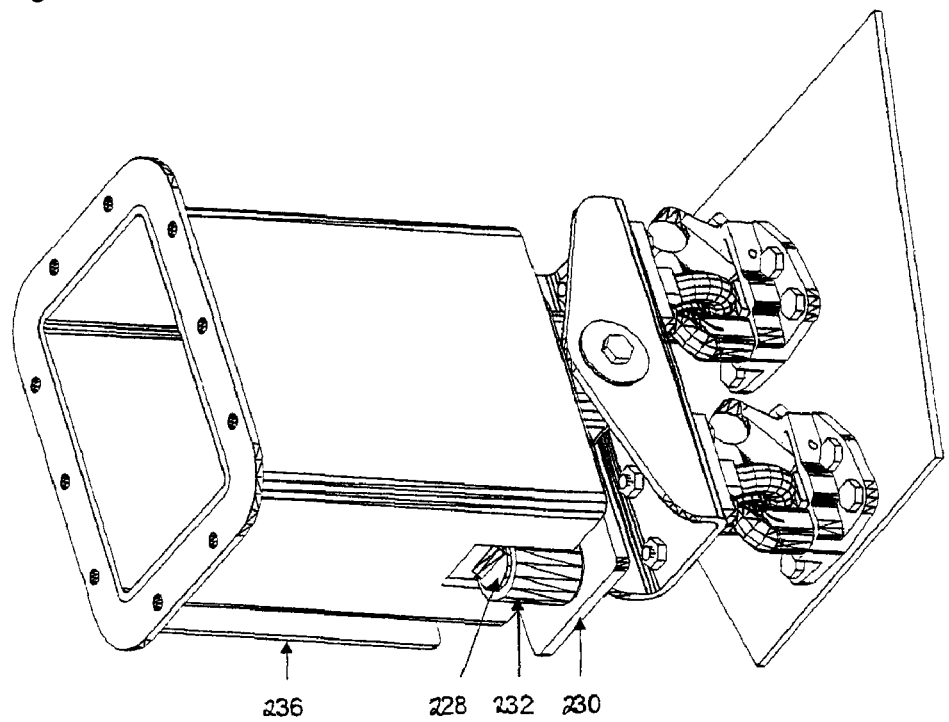
FIG. 29 is the roll coupling assembly of FIG. 28 from a lower perspective view.

FIG. 29 provides a better view of the roll lockout pin (228) and sleeve (232) welded in the lower plate of the roll housing.

Figure 30:
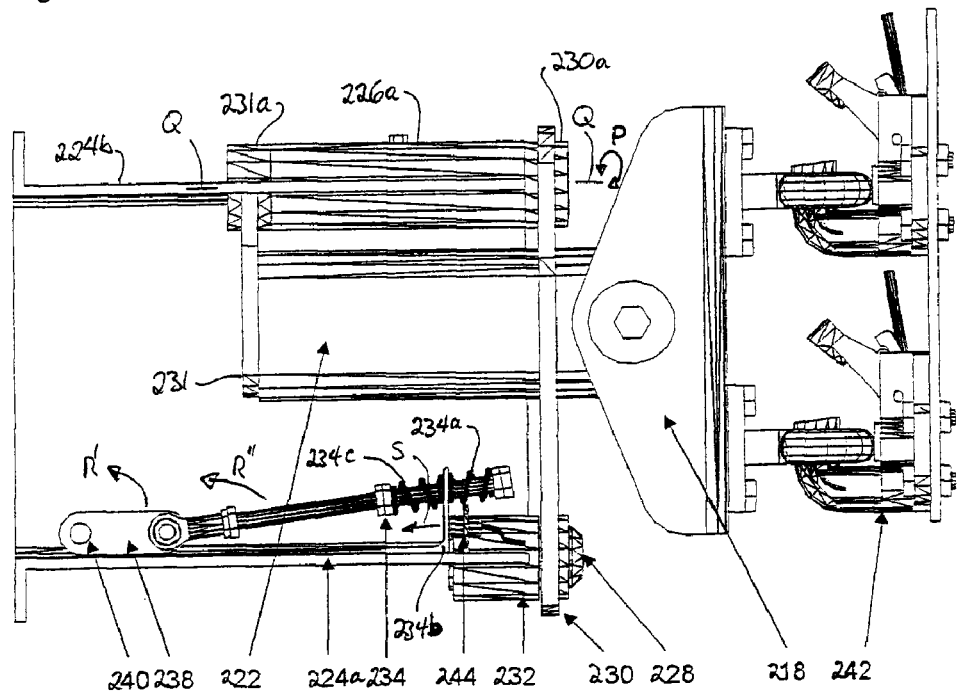
FIG. 30 is, the roll coupling assembly of FIG. 28, in side elevation partially cut-a-way view.

FIG. 30 illustrates the roll lockout linkage 234 in a section view with right side of the roll housing removed. The lockout pin 228 is illustrated in the "locked" position. A proximity sensor or electrical switch 244 may be installed to warn the truck driver when the roll coupling is disengaged.

Figure 31:
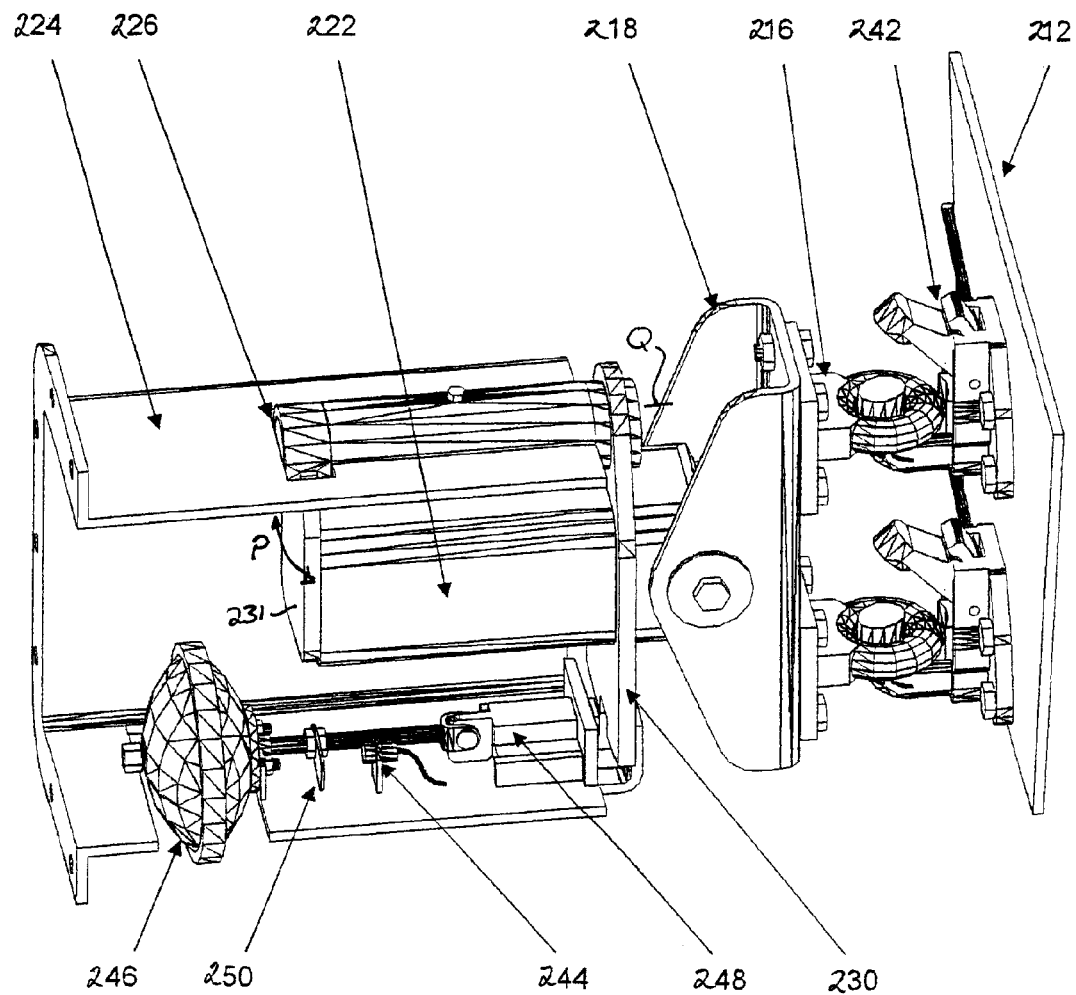
FIG. 31 is, in partially cut-a-way view, an upper perspective view of a further embodiment of the roll coupling assembly of FIG. 30.

FIG. 31 illustrates an alternative embodiment of the invention in a section view with the right side of the roll housing removed. This embodiment uses compressed air bellows 246 to engage a locking device 248 with the forward plate 230. Alternatively electric or hydraulic actuation may also be employed to engage a locking device. The locking device 248 is illustrated in the "disengaged" position. The locking device may be remotely activated either manually or automatically when the trailer reaches an adjustable predetermined speed. A proximity sensor 244 and adjustable trigger plate 250 cooperate to alert the truck driver when the locking device is disengaged.

Figure 32:
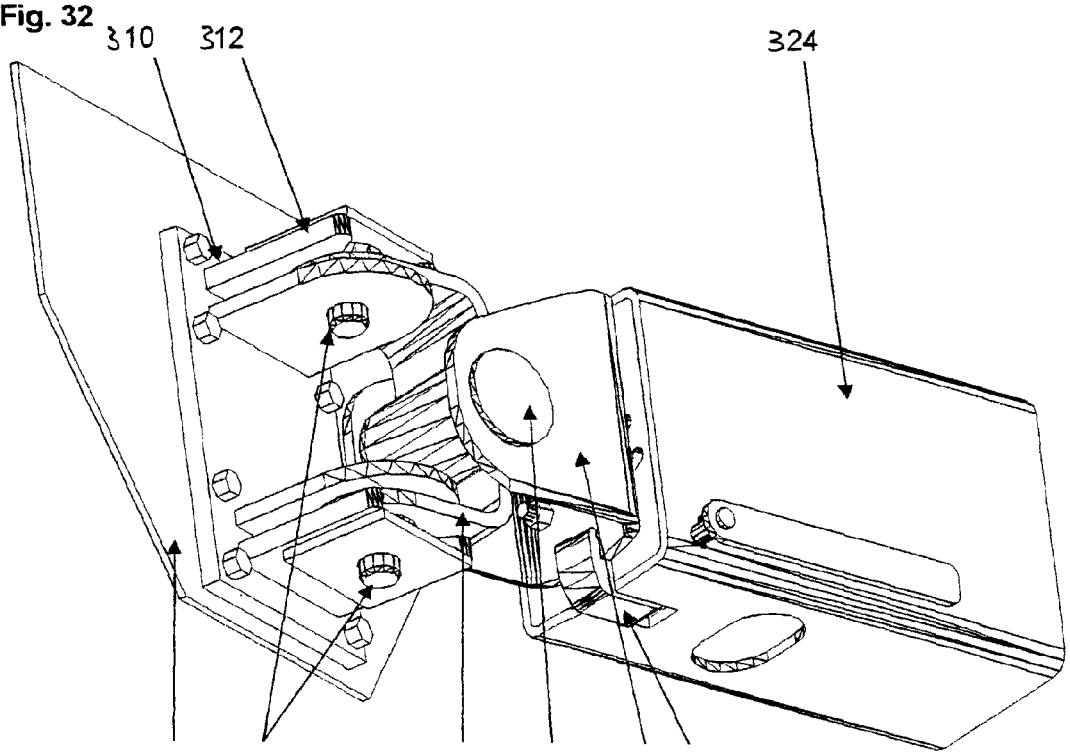
FIG. 32 is, in lower perspective view, a further embodiment of the roll coupling assembly according to the present invention with the drawbar rotated in a horizontal plane.
Figure 33:
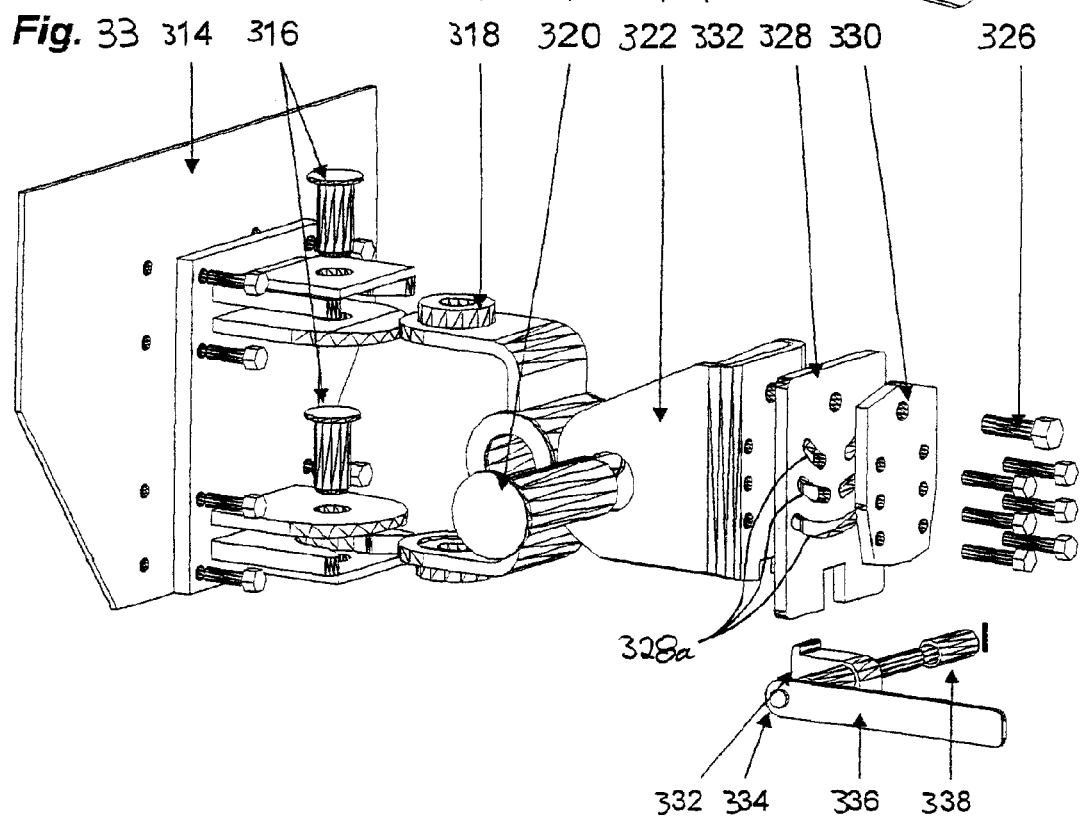
FIG. 33 is, in exploded partially cut-a-way perspective view, the roll coupling assembly of FIG. 32.

FIG. 32 illustrates a truck hitch assembly 310 with guide plates 312 that may be attached to the rear of a truck via a towing apron 314. The trailer hitch in this embodiment is connected to the truck hitch assembly via pins 316 passing through a pitch bracket 318 that rotates around a pitch pin 320. The pitch pin connects the pitch bracket to the roll bracket 322 that is pivotally attached to the drawbar 324 via front plate 328. The roll bracket rotates up to 15 degrees in either direction within the confines of the slots 328a provided in the front plate 328 of the drawbar. Bolts 326 in plate 330 pass through slots 328a so as to anchor the roll bracket to the drawbar assembly. The roll bracket may be selectively locked in a vertical position by engaging roll lockout dog 332 with the front plate 328 and the roll bracket 322. The roll lockout dog 332 is mounted on a shaft 334 connected to the roll lockout handle 336. The dog is centered in the drawbar with two spacers 338.

Figure 36:
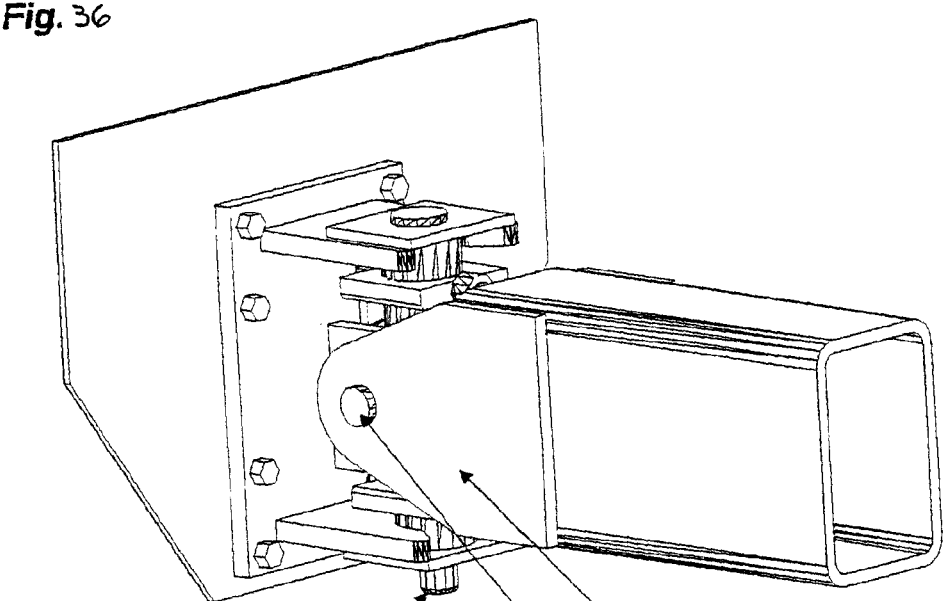
FIG. 36 is, in perspective view, a further embodiment of the roll coupling assembly according to the present invention.
Figure 37:
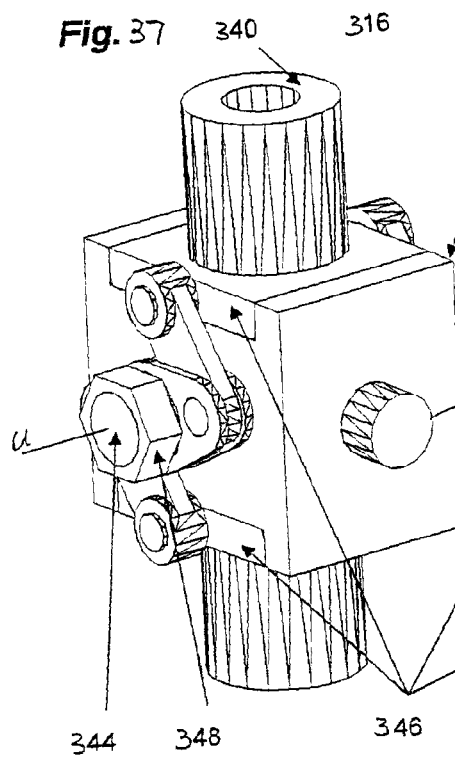
FIG. 37 is, in perspective view, the locking assembly of the roll coupling of FIG. 36, with a locking assembly in its locked position.
Figure 38:
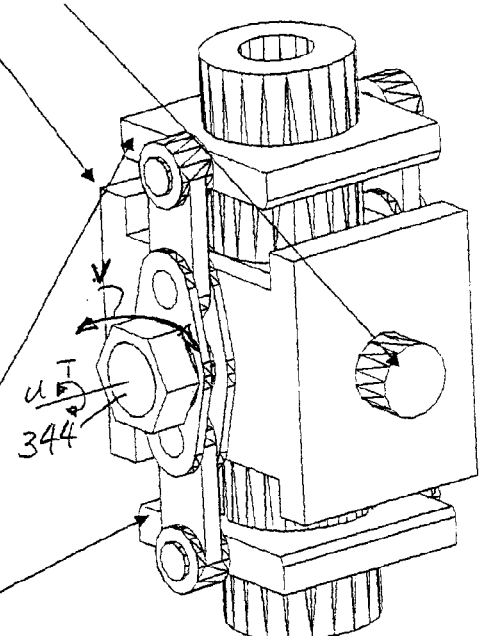
FIG. 38 is, in perspective view, the locking assembly of FIG. 37 in its open position.

FIGS. 36-38 illustrate alternative trailer hitch components in both the "locked" and "unlocked" positions. This embodiment provides a yaw pin boss 340 bored to accept a yaw pin 316 to attach the trailer hitch to the truck hitch assembly similar to the truck hitch illustrated in FIGS. 32-35. The yaw pin boss is pivotally connected to the roll housing 342 via pins 344 to permit up to 15 degrees of roll rotation in direction T about axis U when the locking plates 346 are extended to the unlocked position by rotating nut 348 in direction "V". The roll housing is pivotally connected via pins 350 to the trailer drawbar 324. Housing 342 is free to rotate in direction T independently of rotation of nut 348 in direction V.

There are occasions when vehicles operating on rough terrain should not be roll coupled. For instance, when the loaded trailer of a logging truck slips over a steep bank along the road the operator of the logging truck would prefer to allow the trailer to be free to roll completely 360 degrees relative to the truck so as to dump the load of logs from the trailer bunks before the truck is also dragged over the edge. One embodiment of the present invention provides a means for selectively or automatically engaging and disengaging roll coupling components to provide roll articulation when operating on uneven terrain and roll coupling when operating the vehicle on the highway.

Figure 39:
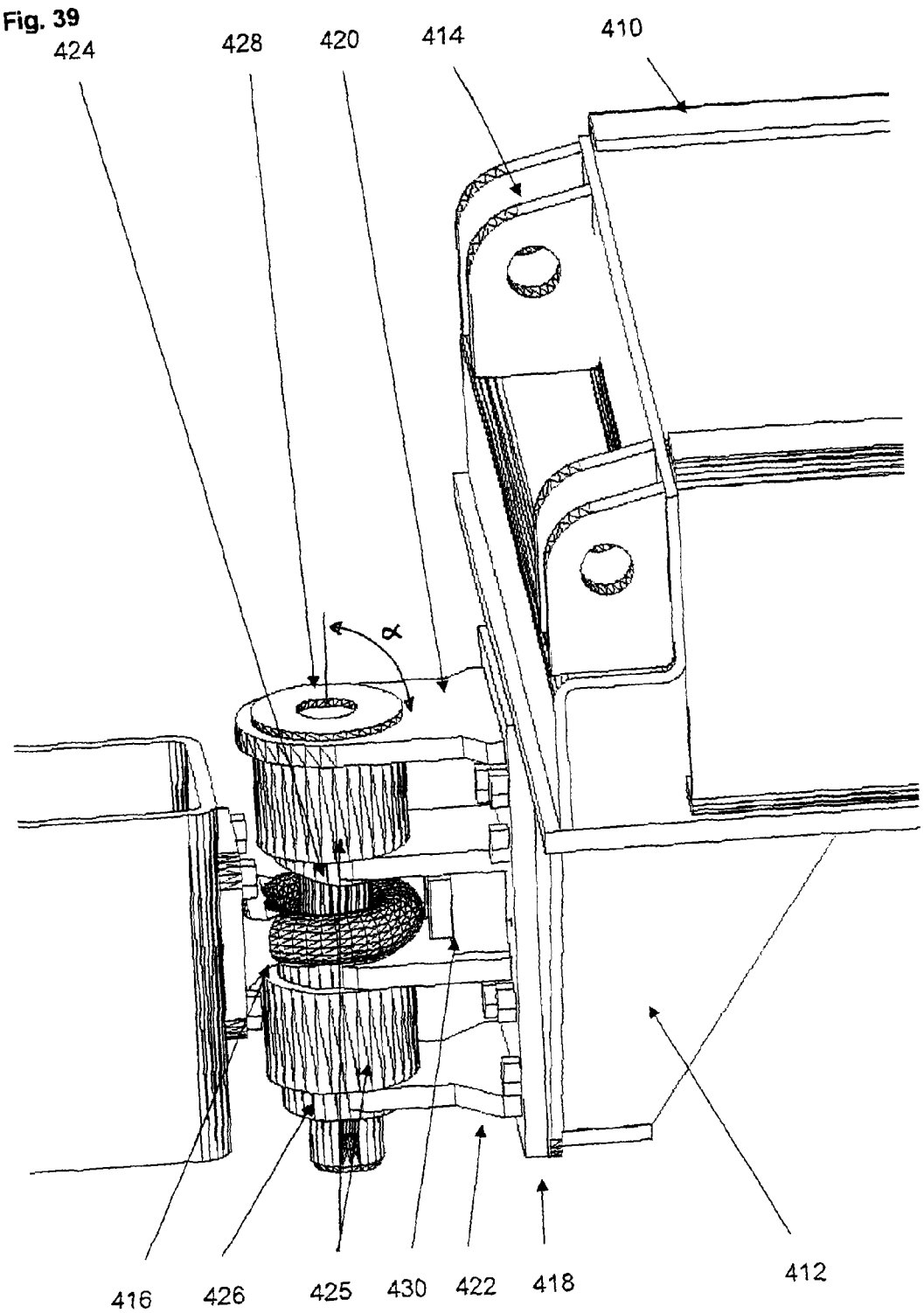
FIG. 39 is, in perspective view, a further embodiment of the roll coupling assembly according to the present invention, with the alignment forks on the drawbar removed to show how the hitch may also be used to pull a conventional drawbar with a single lunette ring.

FIG. 39 illustrates a truck frame 410 attached to a tow apron 412 as would be used on a dump truck. If this was the case the gravel box would be pinned 414 at the top of the apron assembly. Attached to the tow apron 412 is a hitch designed to pull trailers equipped with lunette rings 416 and trailers with roll coupling hitches. The hitch assembly on the truck or tow vehicles has a front plate 418 attached to the apron 412. The front plate 418 is attached to a top plate 420 and three smaller plates 422 that are in turn attached to an upper pin boss 424 and a lower pin boss 426 bored out to accept a yaw pin 428. Pin bosses 424 and 426 may be fitted with rollers 425 to reduce wear between the pin bosses and alignment forks 440 and 442 (shown in FIG. 40). The pin bosses are welded to their corresponding plates 420, 422. The rollers are steel collars which are free to rotate around the pin bosses. The vertical alignment of the pin bosses may be parallel to the apron 412 to allow the trailer hitch assembly to rotate freely around the yaw axis or the pin bosses may be tipped (for example about five degrees) slightly forward towards the tow apron 412, so that an angle a between the centroidal axis through the pins and the horizontal may be about 85 degrees, to provide a pre-load roll force that will cause the trailer to lean into the corner. A no-slack slider 430 is provided to provide constant pressure on the drawbar eye or lunette ring 416.

Figure 40:
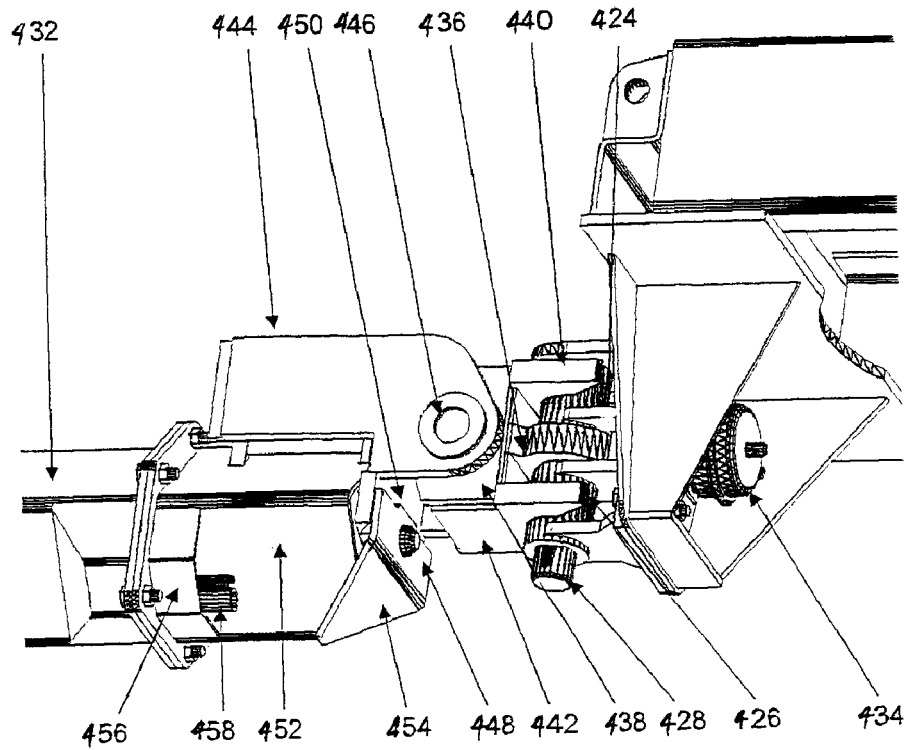
FIG. 40 is, in lower perspective view, a further embodiment of the roll coupling assembly according to the present invention.

FIG. 40 illustrates the same truck configuration attached to a trailer drawbar 432 with a mating roll coupling hitch assembly. This drawing illustrates a spring loaded pneumatic service chamber 434 that is used to apply constant pressure on the no-slack slider 430 illustrated clearly in FIG. 39. The trailer is connected to the truck hitch via the draw eye 436 using yaw pin 428. The draw eye is part of the Pitch assembly 438 equipped with two alignment forks 440 and 442 that engage with the upper and lower pin bosses 424 and 426 respectively. The alignment forks 440 and 442 serve three purposes. They guide the trailer hitch into position when connecting the tow vehicle to the trailer, they hold the hitch in position to enable the yaw pin 428 to be easily inserted or withdrawn and they communicate trailer roll motion to the tow vehicle. The pitch assembly 438 is pivotally connected with the roll assembly 444 via the pitch pin 446. The roll assembly 444 permits the trailer to oscillate on the roll axis unless the roll lockout pin 448 is engaged with the roll assembly front plate 450 and the roll housing 452 and roll housing front plate 454. The roll housing is equipped with an assess port 456 to accommodate service hoses and wires 458 that pass through the drawbar 432 to the trailer body (not shown).

Figure 41:
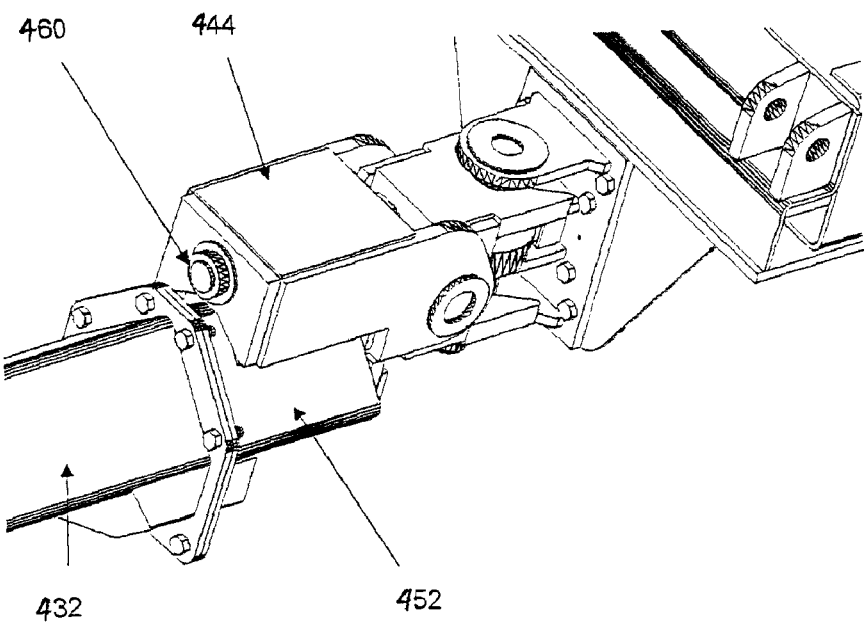
FIG. 41 is, in perspective view, the roll coupling assembly of FIG. 40.

FIG. 41 provides a better view of how the roll assembly 444 is pivotally connected with the roll housing 452 that is attached to the trailer drawbar 432.

Figure 42:
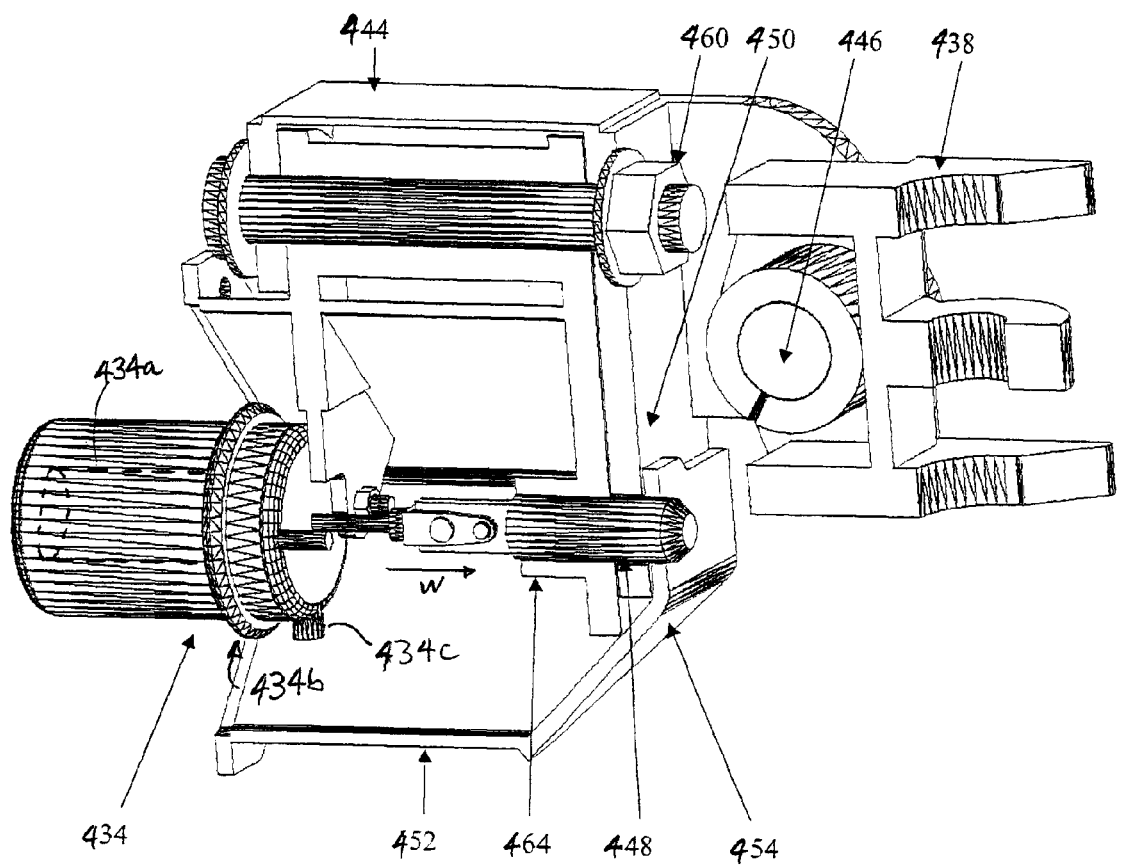
FIG. 42 is, in partially cut-a-way perspective view, the roll coupling assembly of FIG. 40 illustrating the default or locking driver and return driver for locking the roll coupler upon attaining a pre-set speed.

FIG. 42 is a cut-a-way view of the trailer hitch as the concept could be applied to trailers designed to be pulled behind gravel trucks. This drawing better illustrates how the pitch assembly 438 is pivotally connected with the roll assembly 444 via pitch pin 446. The roll assembly 444 in turn is pivotally connected with the roll housing 452 via roll pin 460. This drawing also illustrates a spring loaded service chamber 434 that by default forces the roll lockout pin 448 housed in a pin boss 464 in the roll housing 452 forward through a hole journalled through the front plate of the roll assembly 450 and finally through a hole journalled through the roll housing front plate 454 to selectively prevent the roll assembly 444 from rotating around roll pin 460. Spring loaded service chamber 434 contains a spring 434a (shown by way of example diagrammatically in dotted outline) which urges pin 448 in direction W against the return biasing force of pneumatic bellows 434b which, when inflated, collapse spring 434a thereby extracting pin 448 in a direction reverse to direction W, unlocking the roll coupling. Pneumatic inlet 434c is on the forward side of service chamber 434 to illustrate that pin 448 locks out roll rotation, i.e. locks the roll coupling, under spring pressure from spring 434a. When pin 448 is under the spring pressure, the roll coupling will lock as soon as the holes in the front plate of the roll assembly and in the roll housing front plate align with the pin boss.

The spring loaded service chamber 434 may be manually activated by the operator at any speed to roll couple the vehicle but if the driver forgets to lock out roll rotation manually, the lockout pin 448 will engage automatically under spring pressure the release of which so as to engage the roll coupling is controlled by the antilock braking system module of the trailer (for example as the antilock system activates at its preset speed) or alternative means when the vehicle reaches a preset road speed (for example 30 kilometers per hour). The operator may selectively disengage the roll lockout pin 448 pneumatically but only when the vehicle is travelling below the safety threshold speed.

Figure 43:
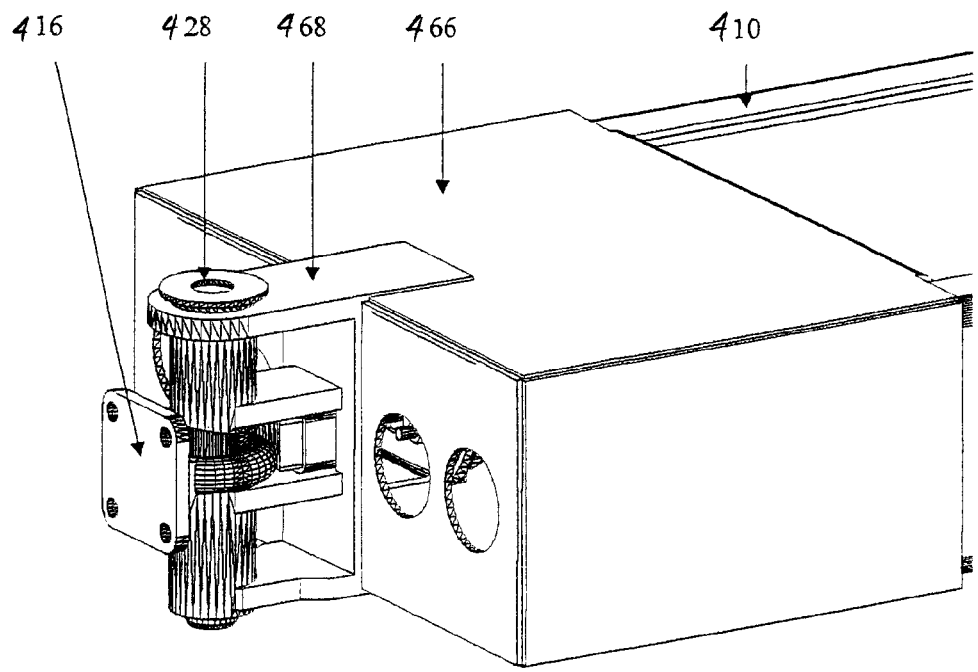
FIG. 43 is, in perspective view, a further embodiment of the roll coupling assembly according to the present invention, with the roll coupling locking assembly removed.

FIG. 43 illustrates the same concept in an alternative embodiment as it could be applied to trailers with straight drawbars such as dollies, pony trailers and full trailers including those that are attached to logging trucks. Trucks that have long frame rails 410 extending a distance past the driving axles may need to be stiffened using a torsion box assembly 466. The torsion box 466 and the truck hitch 468 as previously described can be attached to a lunette ring 416 via yaw pin 428 or a trailer hitch designed to provide roll coupling.

Figure 44:
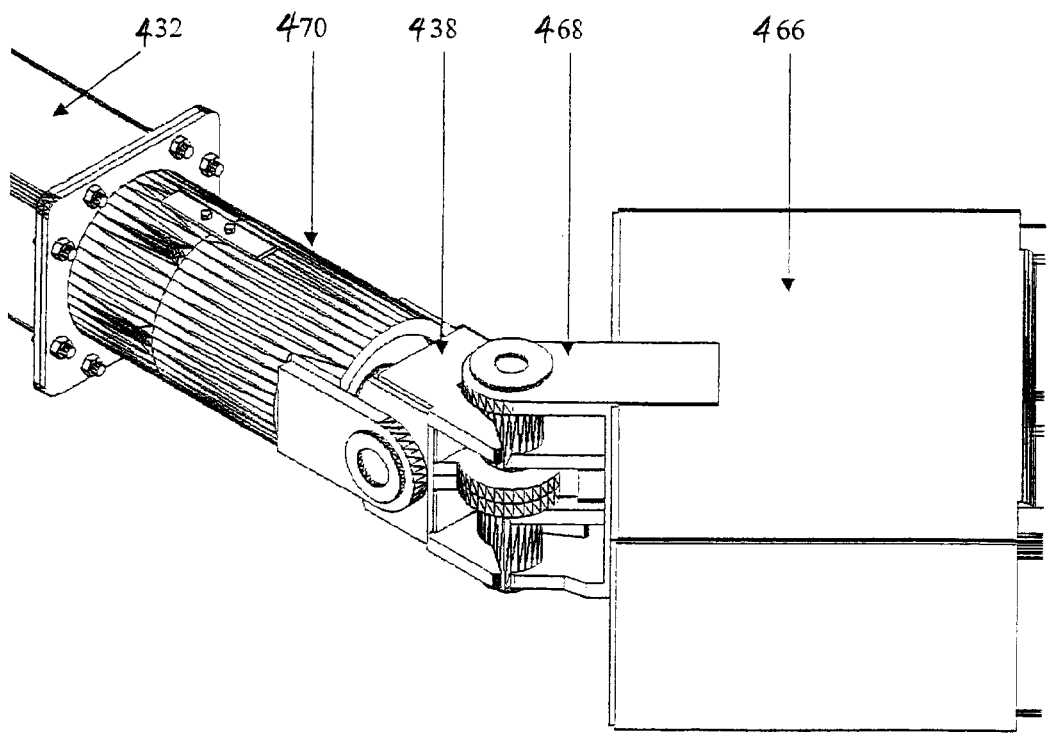
FIG. 44 is, in perspective view, the roll coupling assembly of FIG. 43 with the roll coupler mounted in place.

FIG. 44 illustrates the forward section of a drawbar 432 connected to a selective roll coupling hitch assembly 470 that when disengaged may roll 360 degrees around the roll axis. Pitch assembly 438 is similar to the pitch assembly illustrated in FIGS. 40-42.

Figure 45:
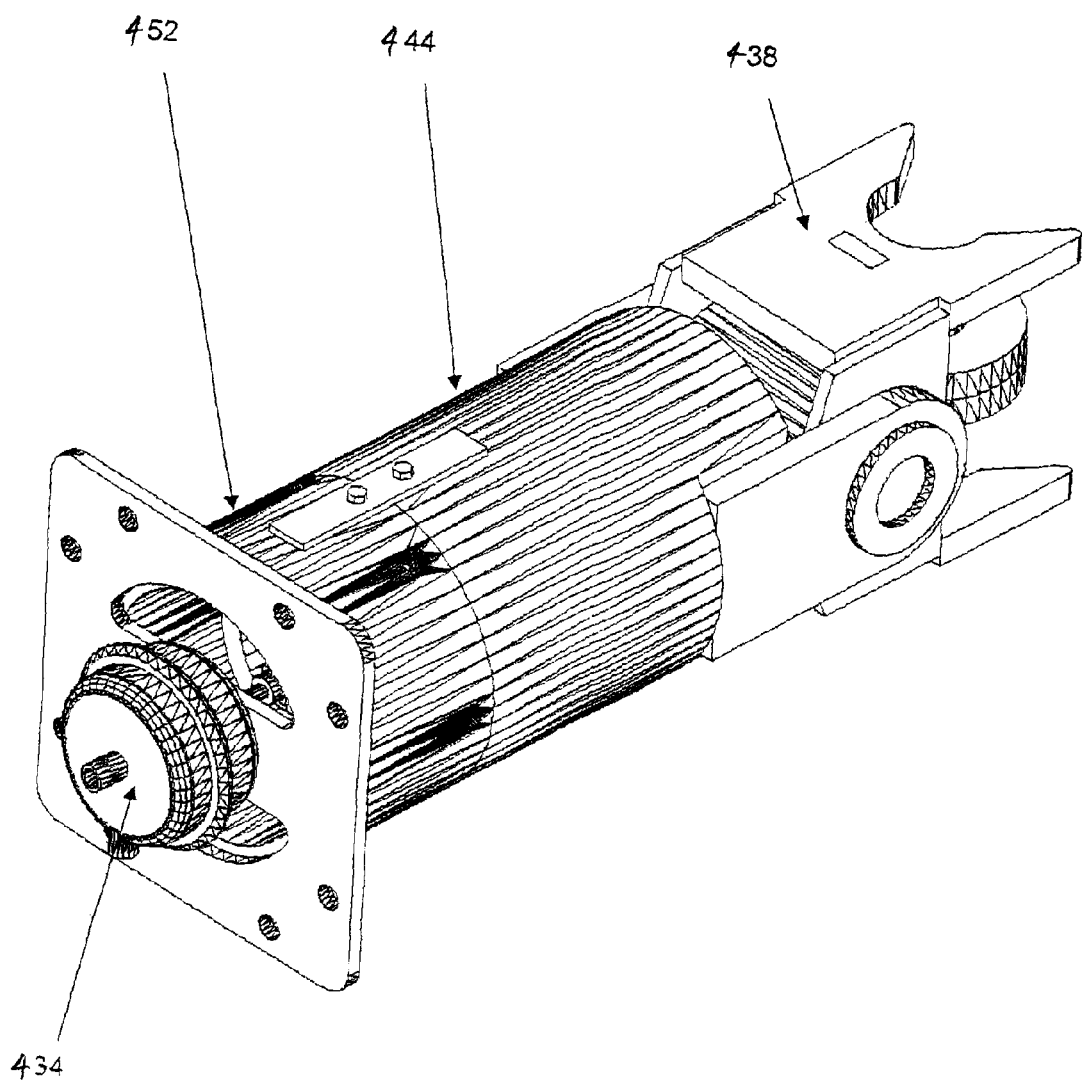
FIG. 45 is, in perspective view, the roll coupling locking assembly of FIG. 44.

FIG. 45 illustrates the trailer hitch assembly. The trailer hitch has pneumatic spring loaded service chamber 434 to lock the roll assembly 444 to the roll housing 452.

Figure 46:
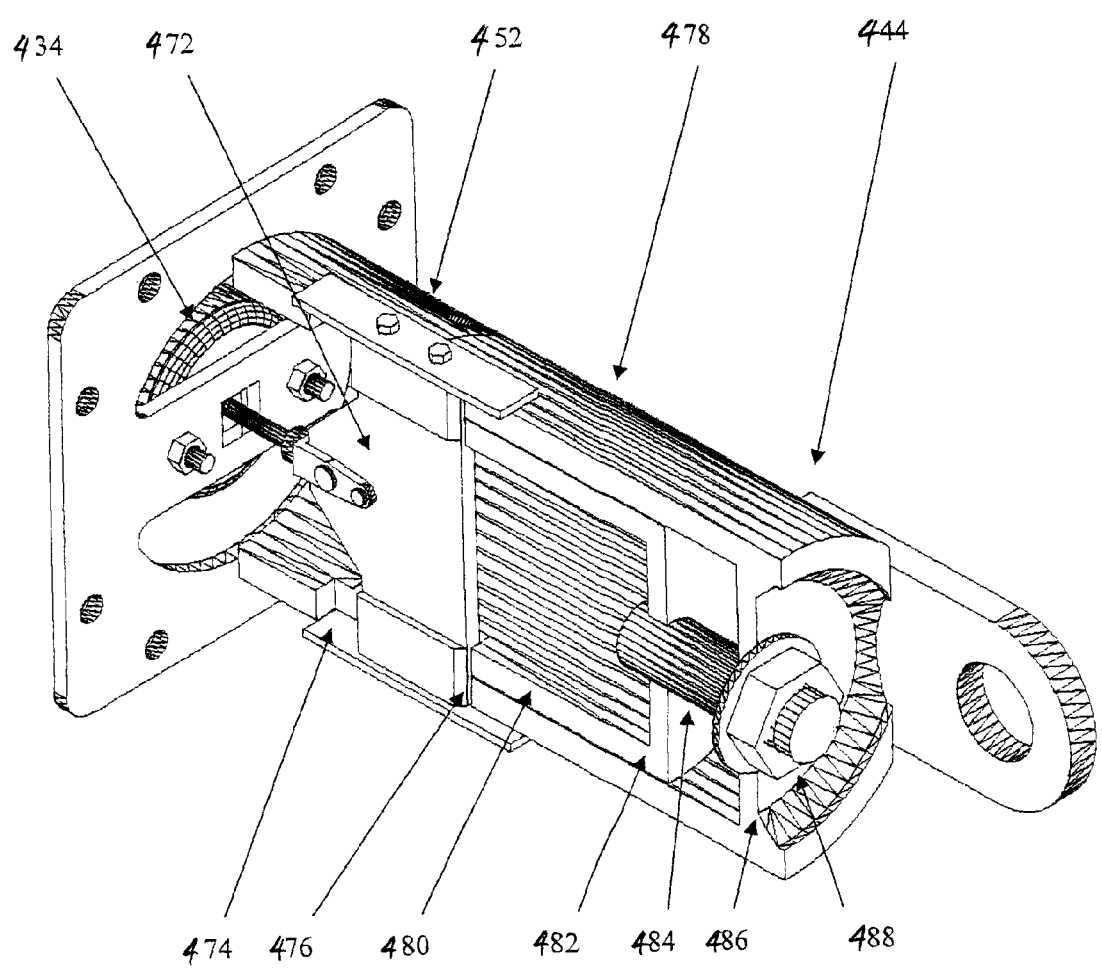
FIG. 46 is, in partially cut-a way perspective view, the roll coupling locking assembly of FIG. 45.

FIG. 46 is a cut-a-way of the hitch assembly that illustrates how the spring loaded service chamber 434 is connected to a knife assembly 472 that slides in a slotted guide 474 in the roll housing 452. When the knife 472 is forced forward while the roll assembly 444 is in alignment with the roll housing 452 the forward portion of the knife 472 engages with a mating slot 476 in the round roll assembly tube 478. When the knife is engaged with the upper and lower slots in the roll housing 452 and the upper and lower slots in the roll assembly 444 the trailer hitch will be roll coupled with the tow vehicle. When the knife 472 is disengaged from the slots in the roll assembly 444 and resting in the slots 474 provided in the roll housing 452, the round tube 478 which is part of the roll assembly 444 can rotate freely around the inner round tube 480 that is welded to and part of the roll housing 452. The inner round tube is capped with a front plate 482 that anchors a threaded bolt 484 that protrudes through a plate 486 in the forward end of the round tube 478 of the roll assembly 444. A threaded nut 488 prevents the roll assembly from sliding forward off the inner round tube.

As with the previous embodiment of the invention illustrated in FIGS. 39 through 42, FIGS. 43-46 are illustrative examples of how the present invention may be implemented. Someone skilled in the art could find alternative methods, and these are intended to fall within the ambit of the present invention, to assemble a rotatable roll assembly with a trailer drawbar, selectively lock and unlock the roll coupling assembly at a pre-set speed, and to align the roll coupling hitch assemblies while connecting or disconnecting the trailer and the tow vehicle.

Figure 47:
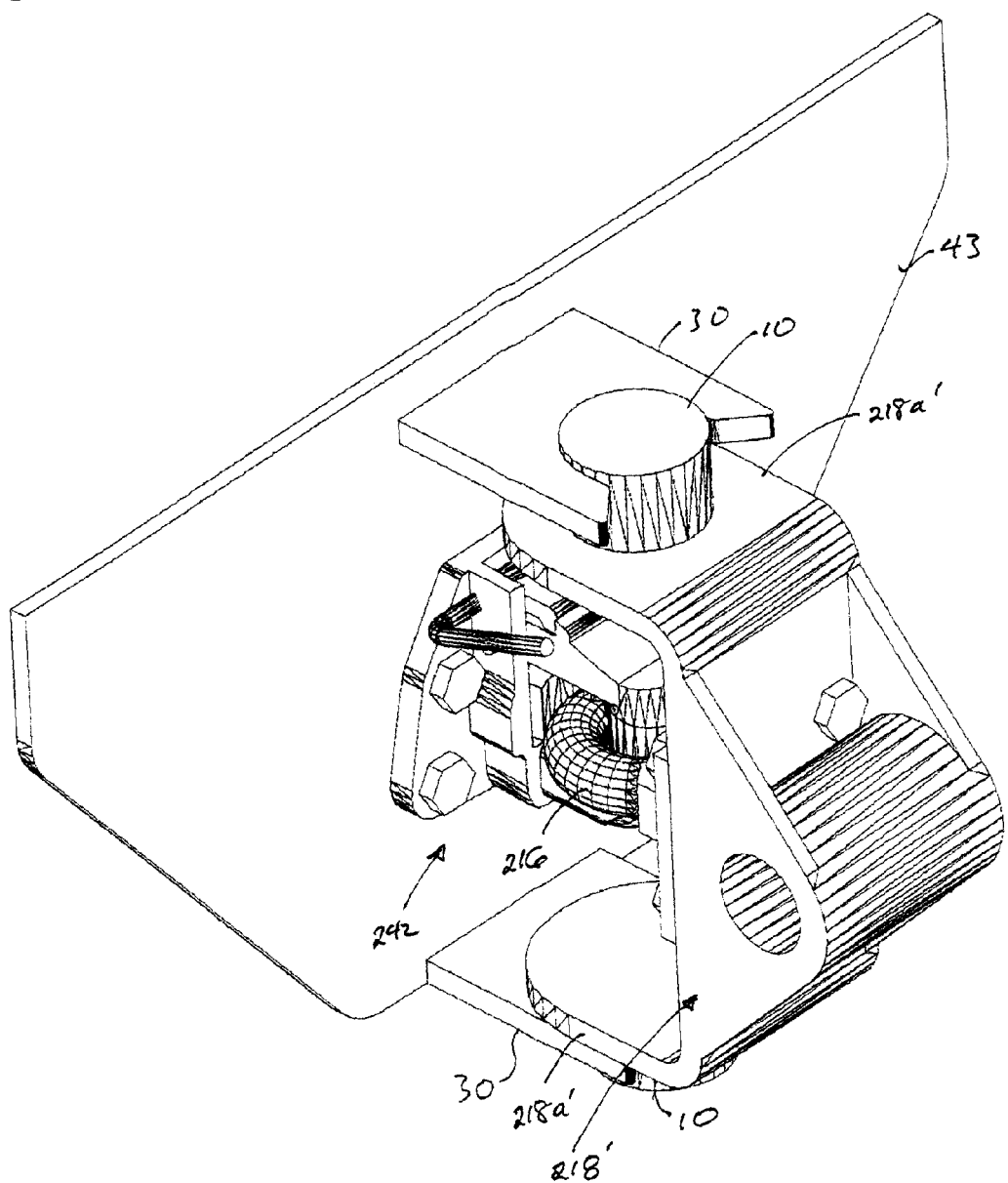
FIG. 47 is, in perspective view, a further embodiment of the roll coupling assembly according to the present invention.
Figure 48:
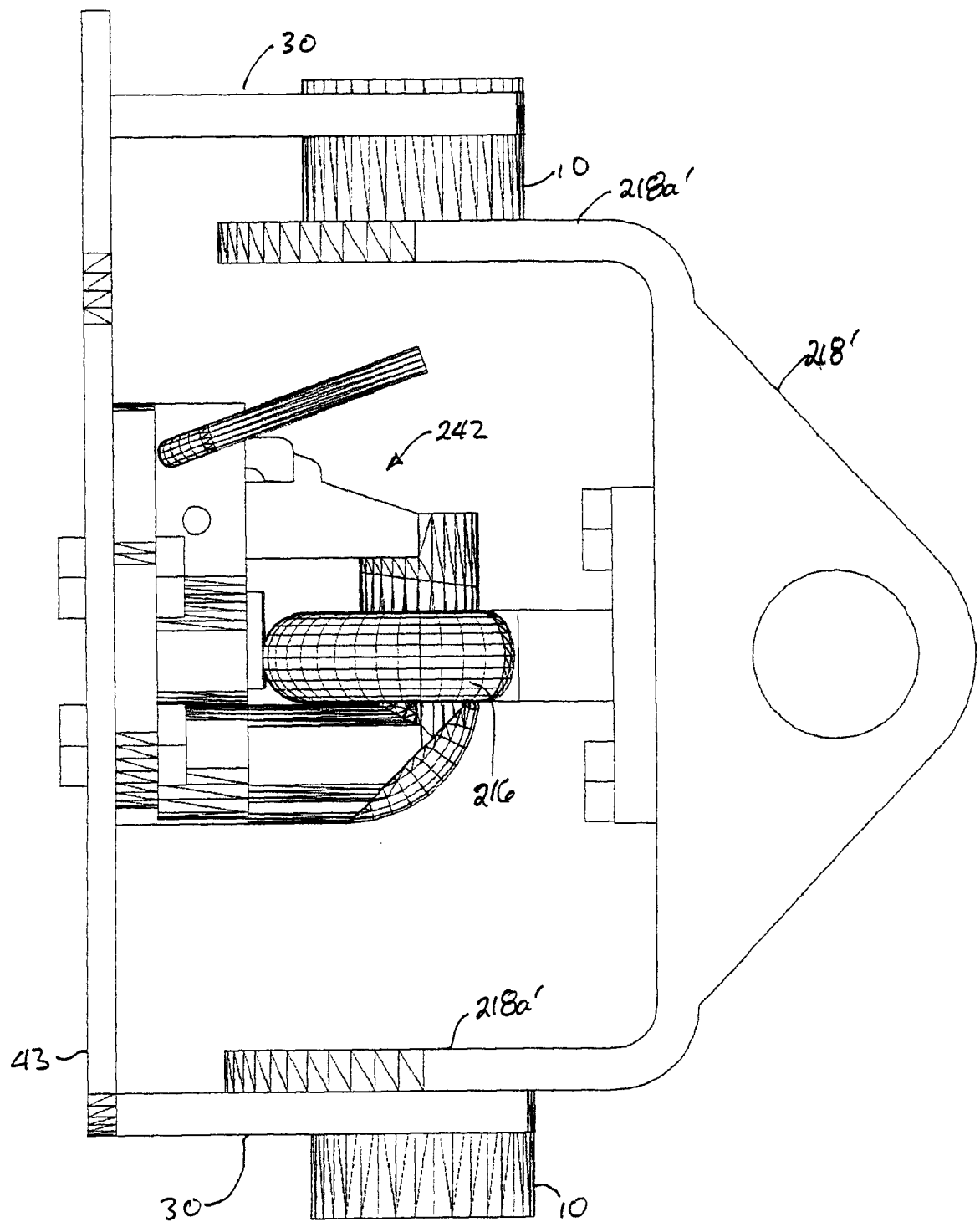
FIG. 48 is, in side elevation view, the roll coupling assembly of FIG. 47.
Figure 49:
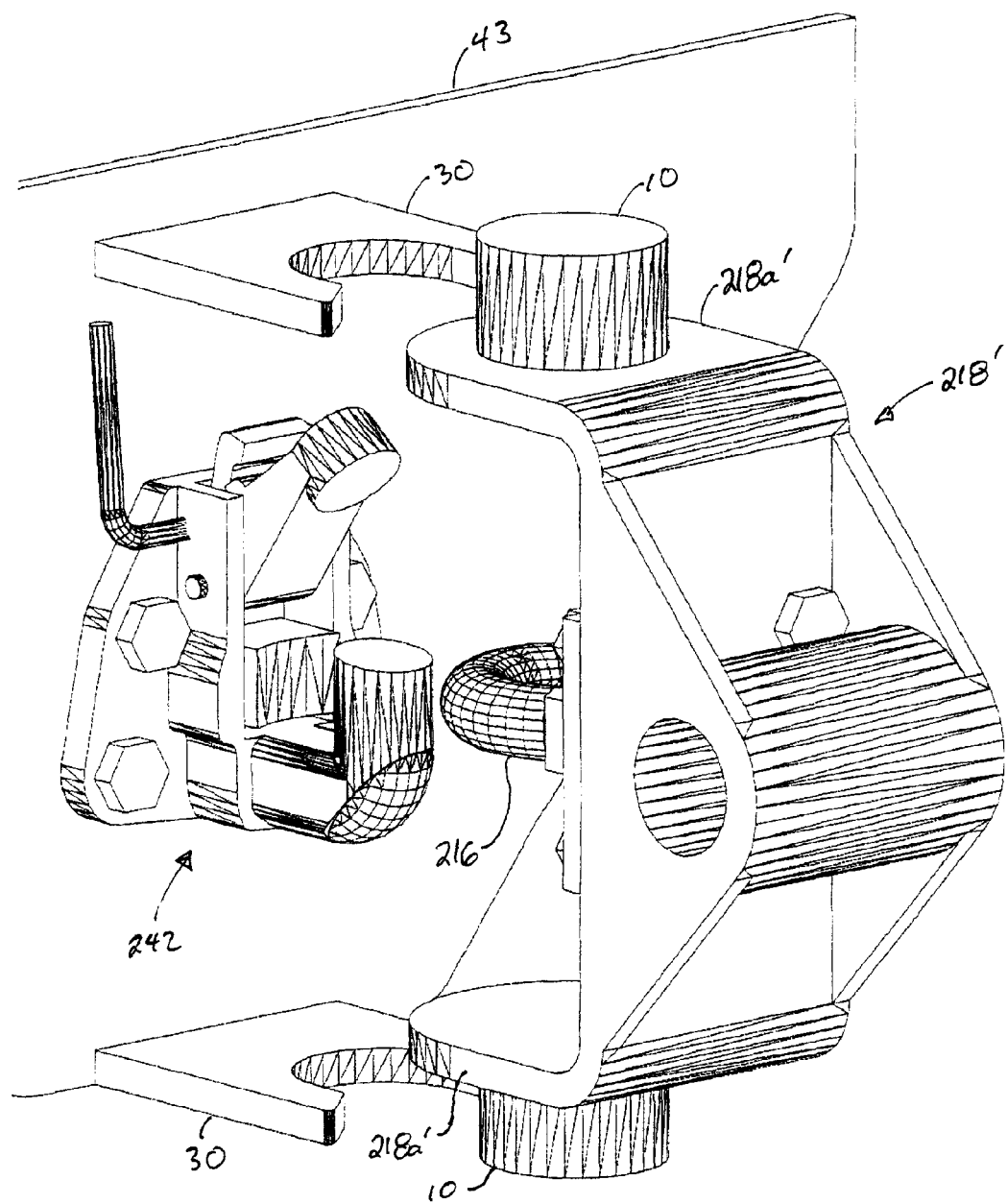
FIG. 49 is, in perspective view, the roll coupling assembly of FIG. 47, with the drawbar assembly unhitched from the rear of the tow vehicle.

In the embodiment of FIG. 47-49, upper and lower guide plates 30 are mounted on towing apron 43. A pintle coupler 242 is mounted to towing apron 43 between the upper and lower guide plates 30. The corresponding lunette ring 216 is mounted to pitch bracket 218'. The pitch bracket is mounted to the drawbar of the trailer for example by the use of a selective roll coupling hitch assembly 470 described above, or other roll coupling assemblies providing for selective locking of the roll coupler. King pins 10 are mounted on the forward arms 218a' of the pitch bracket 218' and engage in guide plates 30.

Transfer trailers are used in the aggregate industry to maximize payload and/or to deliver material into construction sites where it is difficult to unload pony and full trailers. The unique feature about transfer trailers is that the gravel boxes on transfer trailers are designed to fit inside the gravel boxes on the trucks for dumping. After the transfer trailer gravel box has been emptied, the gravel truck straddles and backs over the trailer drawbar to position the truck directly in front of the trailer frame to align and slide the trailer gravel box back on to the trailer frame. This creates two problems that contribute to vehicle instability. Firstly, in order to be able to transfer the box from the trailer into the truck box, the transfer box must ride high enough on the trailer to be vertically aligned with top of the rails in the truck box. Raising the box increases the height of the center of gravity. Secondly, the trailer box must also be narrow enough to fit inside the truck box so in order to carry a full load, the height of the load inside the trailer box must be increased. These design limitations contribute to dynamic instability problems with these trailers because the center of gravity is comparatively much higher than with other trailers designed for hauling aggregate.

The present invention provides a means for roll coupling the transfer trailer with the truck to improve dynamic stability. When anchored to the truck, the roll coupling hitch prevents the trailer drawbar from rotating around the roll axis to improve stability on the roll axis. The second distinguishing feature of the roll coupled transfer trailer is that the drawbar slides under the trailer to enable the truck to back up to the front of the trailer to get into position for transferring the trailer box in and out of the truck box. This enables the drawbar to be manufactured from torsionally rigid material that is too bulky for the truck to back over to reach the trailer frame. In order to attach and detach the trailer hitch from the truck, the drawbar may be selectively raised or lowered using the trailer hydraulic system to align the hitch components. This invention improves productivity by enabling the trailer to be coupled or uncoupled more quickly and improves safety by making the combination vehicle more stable.

Figure 50:
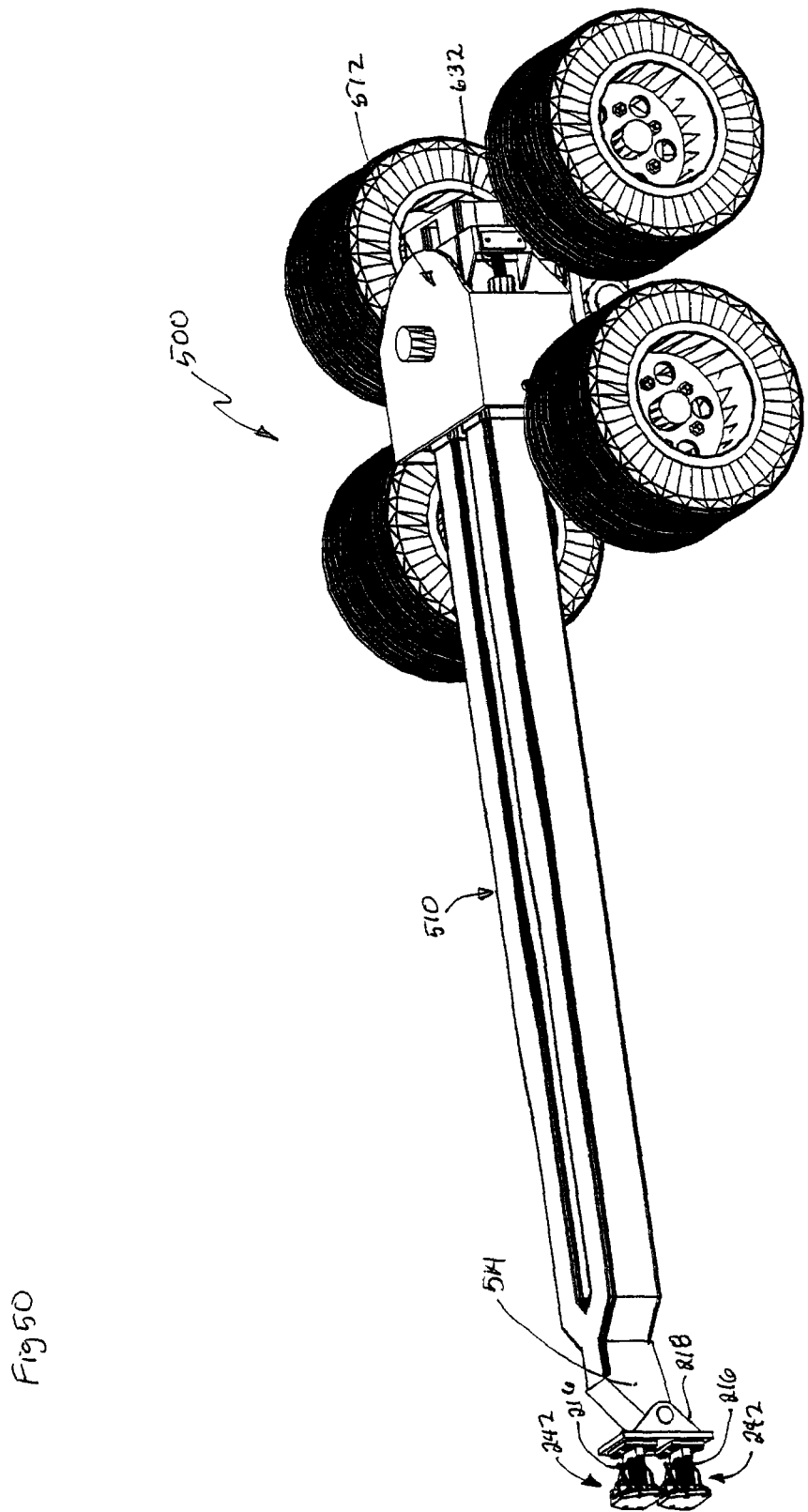
FIG. 50 is, in perspective view, a telescopic drawbar transfer trailer dolly adapted for roll coupled mounting to the tow vehicle using the roll coupling according to the present invention.
Figure 51:
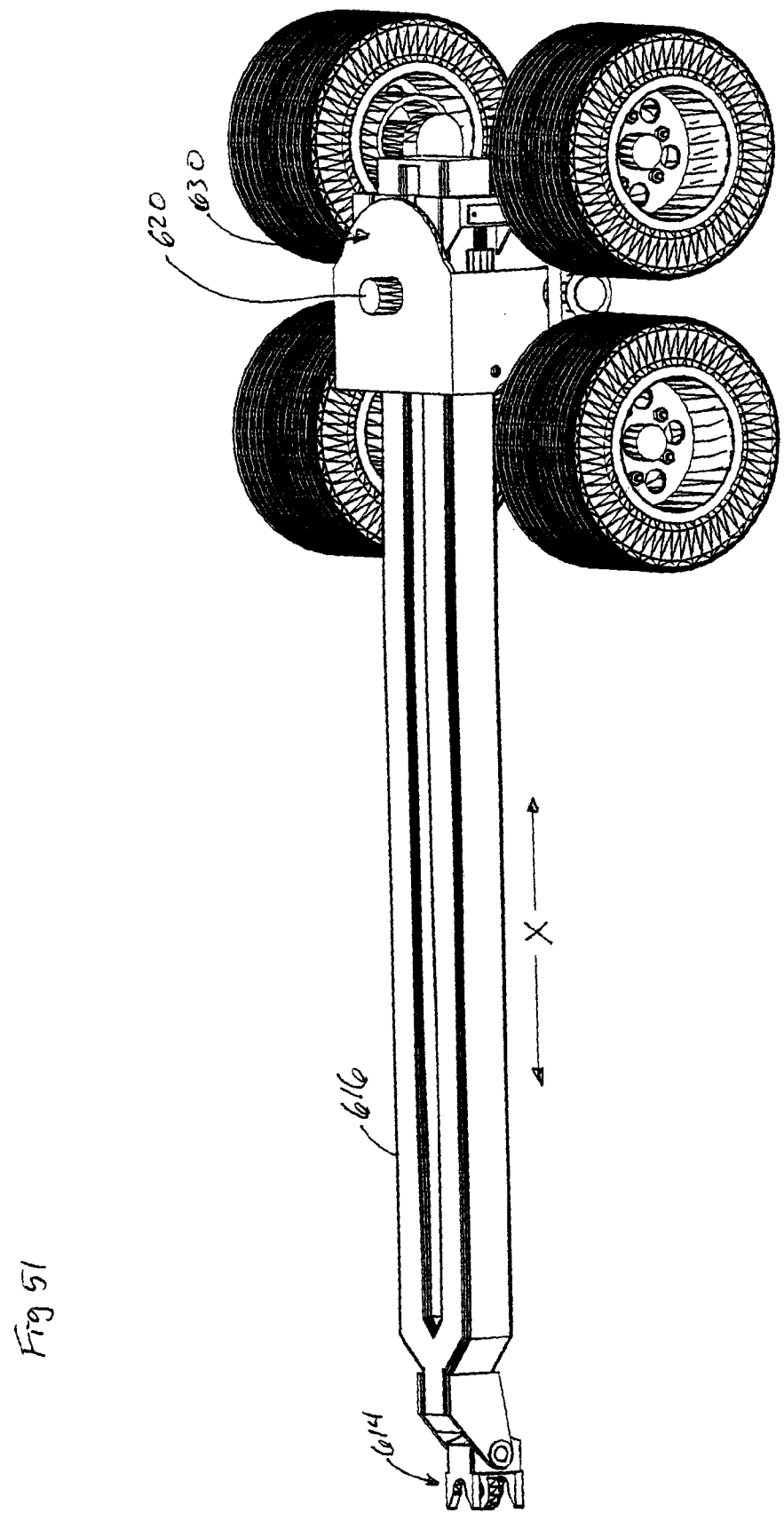
FIG. 51 is and alternative embodiment of the transfer trailer dolly of FIG. 50.

As seen in FIGS. 50 and 51, the dolly assembly for a transfer trailer 500 includes a telescopic drawbar 510 telescopically mounted through trailer coupler 512. A roll coupling hitch assembly 514 is attached to the forward end of the drawbar. Pneumatic actuators may be provided to lock and unlock the drawbar to telescope the drawbar from the trailer coupler, and hydraulic actuators 632 may provide for selectively lifting the end of the drawbar 510 to align with the hitch.

FIG. 52 illustrates a top view of a roll coupled four axle (quad) transfer trailer 610 and FIG. 53 illustrates a side view of the transfer trailer 610 attached to the rear of a gravel truck 612. The two vehicles are connected together with a roll coupling hitch 614 via the trailer drawbar 616. The trailer drawbar connects with a dolly 618 that is pivotally connected via a turntable 620 to the trailer frame 622. The trailer is designed to transport a trailer gravel box 624 to a job site and then slide the trailer gravel box 624 off the trailer frame 622 and into the truck gravel box 626.

The drawbar 616 selectively slides in direction X through a drawbar housing 628 that is pivotally connected to the dolly 618 and the dolly frame 630 that attaches to the turntable 620. The dolly frame 630 houses one or more hydraulic cylinders 632 that are pivotally connected to the dolly frame 630 for the purpose of rotating in direction Y the drawbar housing 628 around the horizontal axis running through to center of pin 634 that also pivotally connects the walking beams 636 to the dolly frame 630.

FIG. 54 illustrates a top view of the dolly assembly with the drawbar illustrated in the retracted position. FIG. 55 illustrates a section view to better illustrate how the housings are assembled.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A roll coupling system for roll coupling the drawbar of a trailer to the rear of a tow vehicle, the system comprising:
   a roll torque transfer structure including at least one first load bearing surface on a first load bearing structure mountable to the rear of the tow vehicle and adapted to be mounted closely adjacent thereto, and at least one second load bearing surface on a second load bearing structure mountable to the front of the trailer drawbar, wherein said first and second load bearing surfaces cooperate so as to releasably mate with one another for towing of the trailer behind the tow vehicle and, when the trailer is so mated to the tow vehicle, are distributed across a substantially planar interface between the rear of the tow vehicle and the front of the trailer drawbar so as to distribute torque imparted to the drawbar by relative rolling motion between the trailer and tow vehicle to the rear of the tow vehicle by distribution of resulting moments which are transferred to the tow vehicle so that the cumulative combined roll resistance of the tow vehicle and trailer resist the rolling of the trailer about the drawbar,
   a coupling alignment mechanism to adjust the relative orientation of said first and second load bearing surfaces in said substantially planar interface so as to align said first and second load bearing surfaces for said mating with one another, wherein said coupling alignment mechanism includes a selectively rotatable coupler, selectively rotatable about the roll axis of the trailer drawbar, mounted between the front of the drawbar and the rear of the tow vehicle, and wherein said selectively rotatable coupler includes a selectively releasable lock, and wherein said coupling alignment mechanism includes at least one roller mounted between said first and second load bearing surfaces to reduce wear between said first and second load bearing surfaces.

2. The system of claim 1 wherein said first and second load bearing surfaces include at least one V-shaped guise mating, in the V-shape of said guise, with a corresponding pin, and wherein said at least one roller is mounted on said pin.

3. The system of claim 1 wherein said lock locks said coupler in a fixed roll coupling position, fixed relative to rotation about said roll axis, upon a pre-set forward translation speed being attained by the tow vehicle and trailer.

4. The system of claim 1 wherein said first and second load bearing surfaces mate at least two spaced apart load transfer points on said substantially planar interface, and wherein said planar interface is inclined from the vertical so that an upper position of said planar interface is tipped towards the tow vehicle so as to provide a pro-load roll force acting on the trailer to cause the trailer to lean into a corner, wherein an upper load transfer point is positioned forward of a lower load transfer point of said spaced apart load transfer points.

5. The system of claim 4 wherein said male load bearing structure includes a hook and wherein said female load bearing structure includes a collar having an aperture sized for snug mating with said hook so as to journal said hook in said aperture, and wherein said first and second load bearing structures are mounted at each of said at least two spaced apart load transfer points, and wherein said at least two spaced apart load transfer points form a substantially linear array.

6. The system of claim 1 wherein said lock includes a male portion interlocking into a corresponding female portion, and wherein said male portion is urged into said interlocking with said female portion by a default driver biasing said male portion into registry with said female portion so that said roll coupling defaults to said locking of said coupler to roll couple the tow vehicle and trailer together.

7. The system of claim 6 wherein said default driver includes a resilient driver.

8. The system of claim 7 wherein said resilient driver includes a spring.

9. The system of claim 6 wherein said lock further includes a return biasing driver for selectively unlocking said roll coupler so as to dis-engage said roll coupling of the tow vehicle and trailer.

10. The system of claim 7 wherein said lock further includes a return biasing resilient driver for resiliently biasing said lock to selectively unlock said roll coupling.

11. The system of claim 6 wherein said roll coupling includes a pair of plates, a first plate of which is adapted to be mounted to the rearmost end of the tow vehicle, a second plate of which is adapted to be mounted to the front end of the drawbar of the trailer, and wherein said pair of plates are substantially flush against one another when the trailer is coupled to the tow vehicle, and wherein said pair of plates pivot relative to one another in flush rotation one over the other, and wherein each plate of said pair of plates has an aperture, and wherein when said apertures in said plates are aligned, the trailer is aligned for roll coupling with the tow vehicle, and wherein said male portion is mounted in one of said apertures and the other of said apertures is said female portion.

12. The system of claim 11 wherein said male portion is an elongate member which is projected into snug mating with said female portion to effect said roll coupling.

13. The system of claim 12 wherein said default driver is a linear driver biasing said member linearly into registry in said aperture of said female portion.

14. The system of claim 13 further comprising a return driver selectively actuable to extract said member from said female portion so as to dis-engage said roll coupling.

15. The system of claim 14 wherein said return driver is a linear driver extracting said member co-axially with said default driver.

16. The system of claim 15 wherein said default driver and said return driver are resilient.

17. The system of claim 16 wherein said linear driver and said return driver are each chosen from the group comprising a resilient spring driver, a pneumatic driver.

18. The system of claim 14 wherein said second plate is adapted to be mounted on the drawbar of the trailer and wherein said first plate is adapted to be mounted to the rear of the tow vehicle.

19. The system of claim 18 wherein said roll torque transfer structure first and second load bearing surfaces are mounted to said first plate, opposite said second plate.

20. The system of claim 1 wherein said lock is adapted to be biased into said locking upon receipt of a locking trigger corresponding to said pre-set forward translation speed.

21. The system of claim 20 further comprising a locking driver locking said lock and a return driver unlocking said lock, and wherein said locking driver is continually biasing said lock into said fixed roll coupling position, and wherein said return driver return biases said locking driver so as to prevent said locking until said trigger is received whereupon said return driver dis-engages from said return biasing of said locking driver.

22. The system of claim 21 wherein said locking driver and said return driver are both resilient drivers.

\* \* \* \* \*